United States Patent
McCall et al.

(10) Patent No.: US 12,122,492 B2
(45) Date of Patent: *Oct. 22, 2024

(54) BARGE OFFLOADING MONITORING SYSTEMS, METHODS, AND KIT

(71) Applicant: MARATHON PETROLEUM COMPANY LP, Findlay, OH (US)

(72) Inventors: Travis McCall, Grayson, KY (US); Brian McClure, Findlay, OH (US); Travis Vollmar, Perrysburg, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,946

(22) Filed: Aug. 21, 2023

(65) Prior Publication Data

US 2023/0391432 A1    Dec. 7, 2023

Related U.S. Application Data

(63) Continuation of application No. 16/988,849, filed on Aug. 10, 2020, now Pat. No. 11,787,515.

(Continued)

(51) Int. Cl.
*B63B 27/34* (2006.01)
*B63B 79/10* (2020.01)
(Continued)

(52) U.S. Cl.
CPC .............. *B63B 79/40* (2020.01); *B63B 79/10* (2020.01); *B63B 79/30* (2020.01); *H04W 4/30* (2018.02); *H04W 4/38* (2018.02)

(58) Field of Classification Search
CPC ......... B63B 79/10; B63B 27/34; B63B 79/30; B63B 79/40; B63B 35/28; B63B 79/00; H04W 4/38; H04W 4/30

(Continued)

(56) References Cited

U.S. PATENT DOCUMENTS 5,552,767 A    9/1996  Toman
6,473,004 B1  10/2002  Smull
(Continued)

FOREIGN PATENT DOCUMENTS

CA    3089873    10/2021

OTHER PUBLICATIONS

Duggal A, Minnebo J. An abstract of "The Floating Production, Storage and Offloading system-past, present and future". InOffshore Technology Conference May 4, 2020 (p. D021S017R005). OTC. (Year: 2020).*

(Continued)

*Primary Examiner* — Cuong H Nguyen
(74) *Attorney, Agent, or Firm* — Womble Bond Dickinson (US) LLP

(57) ABSTRACT

The disclosure includes embodiments of systems, methods, and a kit to monitor remotely operational conditions of a pump engine and a pump mounted on a marine barge during offloading operation of barge petroleum product contents. According to an embodiment, a marine barge monitoring system may include a housing connected to the marine barge in a position to monitor the pump engine and the pump and having an electronic assembly positioned in the housing. The marine barge monitoring system also may include one or more sensors communicatively connected to the relay control module via the input/output module; a status monitoring and communication device communicatively connected to the relay control module; a warning indicator connected to the electronic assembly; and one or more remotely positioned monitoring servers having a memory positioned remote from the marine barge and in communication with the status monitoring and communication device.

26 Claims, 23 Drawing Sheets

Related U.S. Application Data

(60) Provisional application No. 63/012,045, filed on Apr. 17, 2020, provisional application No. 63/011,643, filed on Apr. 17, 2020.

(51) Int. Cl.
| | |
|---|---|
| *B63B 79/30* | (2020.01) |
| *B63B 79/40* | (2020.01) |
| *H04W 4/30* | (2018.01) |
| *H04W 4/38* | (2018.01) |

(58) Field of Classification Search
USPC .......................................................... 701/21
See application file for complete search history.

(56) References Cited

U.S. PATENT DOCUMENTS

| | | | |
|---|---|---|---|
| 6,553,336 | B1 | 4/2003 | Johnson et al. |
| 6,658,349 | B2 | 12/2003 | Cline |
| 6,933,884 | B2 | 8/2005 | Martin et al. |
| 7,023,440 | B1 | 4/2006 | Havekost et al. |
| 7,339,469 | B2 | 3/2008 | Braun |
| 7,492,251 | B1 | 2/2009 | Katz et al. |
| 7,496,475 | B2 | 2/2009 | Byrne et al. |
| 7,788,476 | B2 | 8/2010 | McNutt et al. |
| 8,036,847 | B2 | 10/2011 | Discenzo |
| 8,204,786 | B2 | 6/2012 | LeBoeuf et al. |
| 8,354,927 | B2 | 1/2013 | Breed |
| 9,092,026 | B2 | 7/2015 | Matsuda et al. |
| 9,674,642 | B2 | 6/2017 | Singh et al. |
| 9,998,543 | B2 | 6/2018 | Procopio |
| 10,925,114 | B1 * | 2/2021 | Smith ................... H04W 24/02 |
| 11,578,638 | B2 * | 2/2023 | Thobe ....................... F17C 7/00 |
| 11,787,515 | B2 * | 10/2023 | McCall ................... B63B 79/40 |
| | | | 701/21 |
| 11,988,336 | B2 * | 5/2024 | Thobe ................... B67D 7/0492 |
| 2018/0072384 | A1 | 3/2018 | von Mueller |
| 2019/0121348 | A1 * | 4/2019 | Cella ...................... G06N 3/084 |
| 2021/0323643 | A1 | 10/2021 | McCall et al. |
| 2023/0391432 | A1 * | 12/2023 | McCall ................... B63B 79/10 |

OTHER PUBLICATIONS

Neutrik XXR-2 XX Series, https://www.parts-express.com/Neutrik-XXR-2-XX-Series-Color-Coding_Ring-Red, 2022. Hou, Qingmin, An FBG Strain Sensor-Based NPW Method for Natural Gas Pipeline Leakage Detection, Hindawi, Mathematical Problems in Engineering, vol. 2021, Article ID 5548503, pp (Year: 2021).*

Oily Bilgewater Separators by Environmental Protection Agency (Year: 2011).*

Da Silva Augusto, Paulo Jorge, Past, Present & Future of Marine Automation, Faculdade de Engenharia da Universidade do Porto, Jan. 26, 2016.

Javanmard H. et al., Optimizing the preventive maintenance scheduling by genetic algorithm based on cost and reliability in National Iranian Drilling Company, J INd Eng INt (2016) 12, 509-516.

Guyer, J. Paul, An Introduction to Petroleum Fuel Facilities: Marine Fueling Facilities, Continuing Education and Development, Inc., 2014.

Information Disclosure Declaration by Brian McClure, May 10, 2021.

Canadian Intellectual Property Office, Office Action for Canadian Application No. 3,089,873, Dec. 29, 2022.

Iridium Satellite LLC, Iridium Short Burst Data Service Developers Guide, Release 3.0, Mar. 9, 2012.

Environmental Protection Agency Washington DC. an abstract of "Oily Bilgewater Separators". (Year: 2011).

Joint Publications Research Service Arlington VA. "JPRS-USSR Report, Energy, No. 122." (1982): 0064.

* cited by examiner

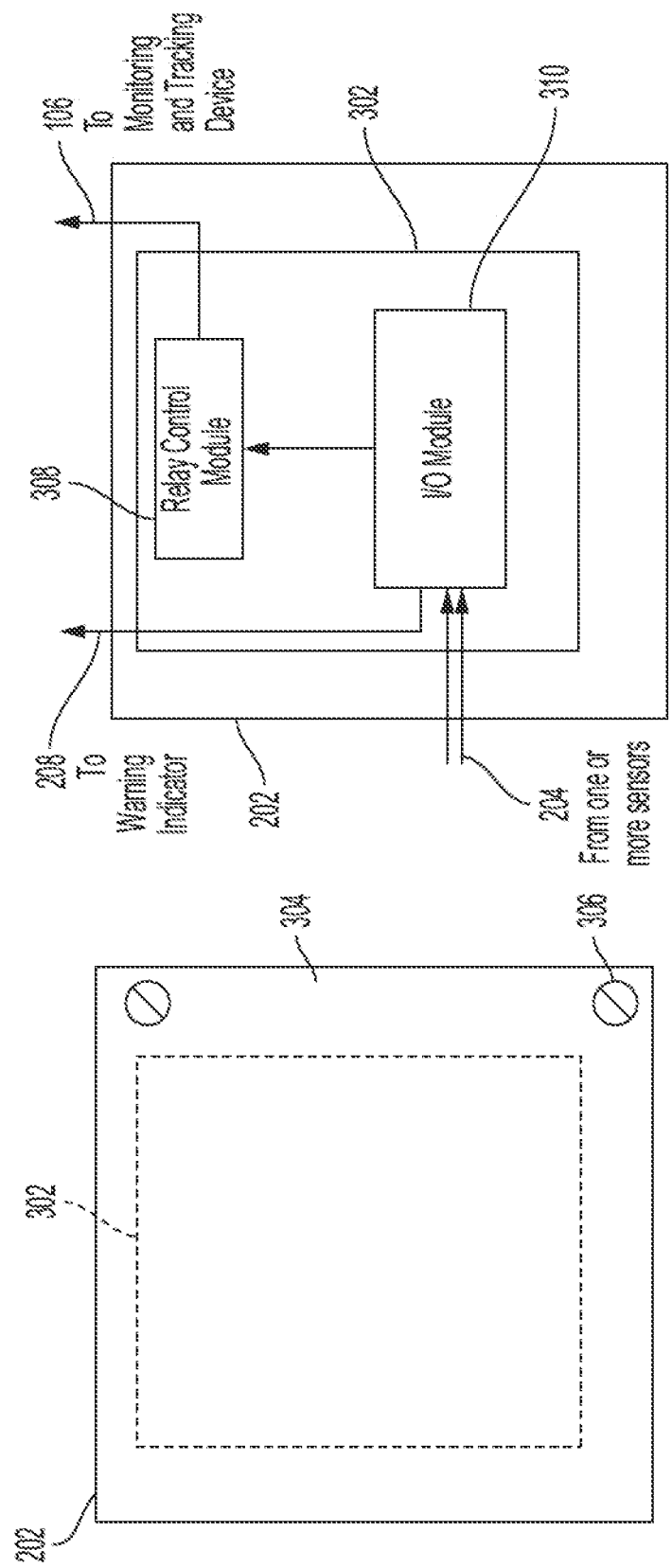

Pump Engine Parameters Table 420

| ESN | Coolant Temperature | Oil Viscosity | Oil Pressure | | Battery Volts |
|---|---|---|---|---|---|
| 30023406519840 | Temp 1 | Oil Viscosity 1 | Oil Pressure 1 | | Battery Volts 1 |
| 30023406519840 | Temp 2 | Oil Viscosity 2 | Oil Pressure 2 | | Battery Volts 2 |
| ⋮ | ⋮ | ⋮ | ⋮ | | ⋮ |
| 30023406519840 | Temp n | Oil Viscosity n | Oil Pressure n | | Battery Volts n |

FIG. 4B

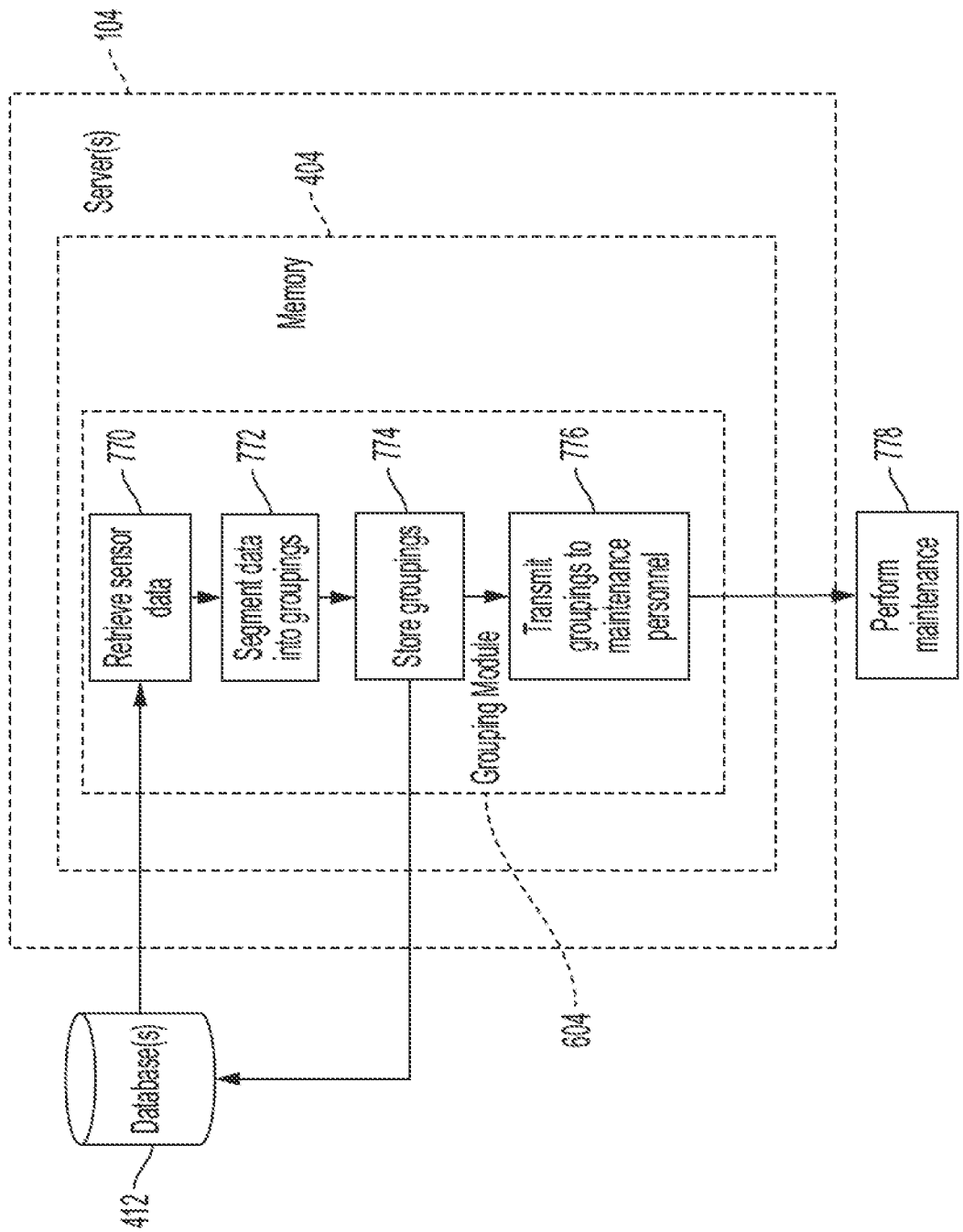

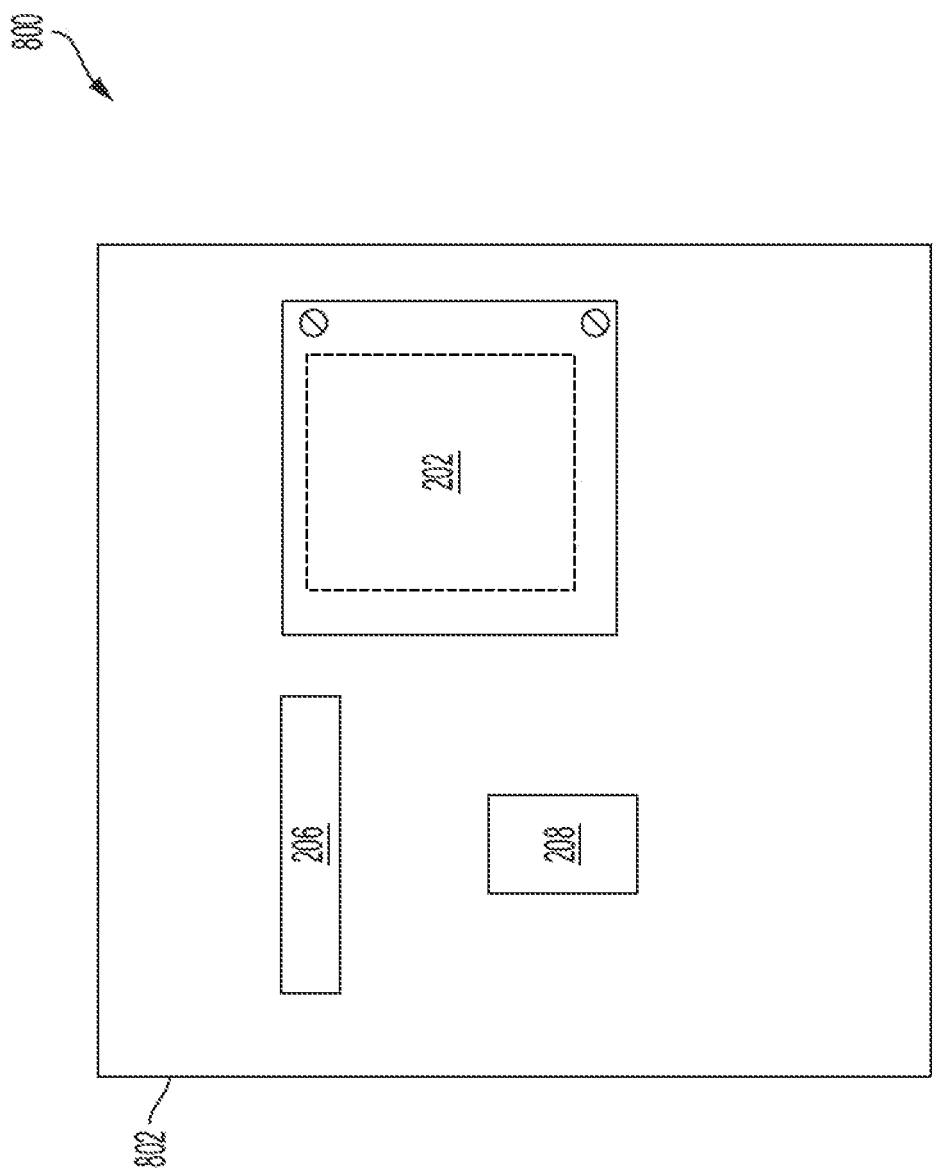

BARGE OFFLOADING MONITORING SYSTEMS, METHODS, AND KIT

CROSS REFERENCE TO RELATED APPLICATIONS

This is a continuation of U.S. Non-Provisional application Ser. No. 16/988,849, filed Aug. 10, 2020, titled "BARGE OFFLOADING MONITORING SYSTEMS, METHODS, AND KIT," which claims priority to and the benefit of U.S. Provisional Application No. 63/012,045, filed Apr. 17, 2020, titled "BARGE OFFLOADING MONITORING SYSTEMS, METHODS, AND KIT," and U.S. Provisional Application No. 63/011,643, filed Apr. 17, 2020, titled "BARGE OFFLOADING MONITORING SYSTEMS, METHODS, AND KIT," the entire disclosures of which are incorporated herein by reference.

FIELD OF DISCLOSURE

The present disclosure relates generally to the field of remote monitoring and management of one or more marine barges. More specifically, the present disclosure relates to systems, associated methods, and a kit to monitor various assets on the one or more marine barges defining a fleet, to oversee offloading petroleum products operations, enhance maintenance, and reduce downtime of the various assets.

BACKGROUND

Remote monitoring may be important to marine barge operation and maintenance. Although some marine barges may be equipped with local analog gauges to provide readings for selected data points, Applicant has recognized that there is little available to remotely monitor the marine barges and acquire data to analyze, alert, and enhance operations and maintenance of the equipment positioned on the marine barges.

Accordingly, Applicant has recognized that there is a need for systems, related methods, and a kit for marine barge fleet monitoring and management which may be used to enhance and provide visibility to central groups for marine barge fleet management.

SUMMARY

Embodiments of the present disclosure provide operational conditions of a pump engine and a pump on a marine barge to be monitored remotely during offloading operation of barge petroleum product contents, resulting in enhanced oversight of marine barge operations, as well as enhanced monitoring and providing of maintenance schedules and maintenance activities. Sensors also may be used in embodiments for logistics, planning, scheduling, and environmental operational uses.

The embodiments of the present disclosure are directed to systems, methods, and a kit for monitoring operational conditions of a pump engine and a pump mounted on a marine barge during offloading operation of barge petroleum product contents, for example.

In one aspect of the disclosure, a marine barge monitoring system to monitor remotely operational conditions of a pump engine and a pump mounted on a marine barge during offloading operation of barge petroleum product contents, for example, may include a housing. The housing may be connected to the marine barge in a position to monitor the pump engine and the pump and having an electronic assembly positioned in the housing. The electronic assembly may include a relay control module and an input/output module.

The marine barge monitoring system may also include one or more sensors communicatively connected to the relay control module via the input/output module. The one or more sensors may be positioned to sense physical properties associated with the pump engine and the pump and generate data signals indicative of the operational conditions of the pump engine and the pump.

In one embodiment, for example, the marine barge monitoring system may further include a status monitoring and communication device communicatively connected to the relay control module. The status monitoring and communication device may include one or more processors. The marine barge monitoring system may be connected to a power source of the marine barge and may be positioned to receive the generated data signals from the one or more sensors. The marine barge monitoring system also may be positioned to transmit the generated data signals therefrom.

In yet another disclosed embodiment, the marine barge monitoring system may include a warning indicator connected to the electronic assembly and responsive to one or more determinations that one or more preselected thresholds, associated with operational conditions of the pump engine and the pump and being sensed by the one or more sensors, have been met thereby indicating an improper operational condition. In one embodiment, the warning indicator further may be positioned to provide a visual warning to barge offloading operation personnel when offloading the petroleum product contents.

According to one embodiment of the present disclosure, the marine barge monitoring system may further include one or more remotely positioned monitoring servers having a memory positioned remote from the marine barge and in communication with the status monitoring and communication device. The one or more remotely positioned monitoring servers may be configured to store the generated data signals from the one or more sensors as monitored sensor data, and display a real-time visual representation of the monitored sensor data on a display associated with the one or more remotely positioned monitoring servers thereby to report in real time the operational conditions of the pump engine and the pump and thereby define a dashboard interface to monitor the pump engine and the pump during the offloading operation of the petroleum product contents.

In one embodiment, for example, the one or more determinations, by the input/output module in communication with the warning indicator, that the one or more preselected thresholds have been met may include receiving a pump engine rotational speed signal associated with a rotating component of the pump engine from the one or more sensors. The received pump engine rotational speed signal may be corresponding to a value of a pump engine rotational speed. The one or more determinations, by the input/output module in communication with the warning indicator, that the one or more preselected thresholds have been met may also include comparing the value of the pump engine rotational speed to the preselected thresholds, determining whether the value of the pump engine rotational speed exceeds the one or more preselected thresholds, and generating a local alarm signal to activate the warning indicator, thereby alerting the barge offloading operation personnel when the pump engine rotational speed exceeds the one or more preselected thresholds when offloading the petroleum product contents.

In another embodiment, the one or more determinations, by the input/output module in communication with the warning indicator, that the one or more preselected thresholds have been met may include receiving a pump pressure signal associated with the pump from the one or more sensors. The received pump pressure signal may be corresponding to a value of a pump pressure. In one embodiment, the pump may be positioned to transfer the petroleum product contents from the marine barge to one or more product storages. The one or more determinations, by the input/output module in communication with the warning indicator, that the one or more preselected thresholds have been met may also include comparing the value of the pump pressure to the one or more preselected thresholds, determining whether the value of the pump pressure associated with the pump is less than the one or more preselected thresholds, and generating a local alarm signal to activate the warning indicator, thereby alerting the barge offloading operation personnel when the pump pressure drops below the one or more preselected thresholds when offloading the petroleum product contents.

In yet another disclosed embodiment, the memory of the one or more remotely positioned monitoring servers may include a notification module configured to transmit a notification message to one or more remotely positioned predetermined devices responsive to the improper operational condition. The notification message may include one or more descriptions describing a symptom associated with the improper operational condition of the pump engine and the pump, thereby notifying the barge offloading operation personnel the warning indicator has been activated and prompting for a condition-based corrective maintenance.

According to an embodiment of the present disclosure, the status monitoring and communication device may include a transceiver in communication with the one or more processors associated with the status monitoring and communication device. The transceiver may be associated with the status monitoring and communication device being configured to transmit the generated data signals as one or more communication messages in a short burst data format to a remotely positioned gateway via a satellite network.

In one embodiment, for example, the memory of the one or more remotely positioned monitoring servers may further include a grouping module configured to segment the monitored sensor data into one or more groupings based on the physical properties associated with the pump engine and engine of the marine barge; and transmit the one or more segmented groupings to one or more groups of maintenance personnel responsible for maintaining a life-cycle management of the pump engine and the engine based on the physical properties associated with the pump engine and the engine of the marine barge.

In another embodiment, the memory of the one or more remotely positioned monitoring servers may further include a fault adviser module, the fault adviser module being configured to retrieve a selected predefined rule based on historical data associated with the operational conditions of the pump engine and the pump from a rule database; compare a selected data retrieved from the monitored sensor data to the retrieved selected predefined rule to predict a failure associated with the pump engine and the pump; and generate a diagnosis report to initiate an intervention for maintenance associated with the predicted failure associated with the pump engine and the pump, thereby reducing downtime associated with an unplanned intervention for repair.

In one embodiment, for example, the status monitoring and communication device may be connected to and in communication with the input/output module via the relay control module positioned in the housing. The housing may be positioned adjacent a location of the pump engine and the pump on the marine barge. The input/output module may include one or more input channels and one or more output channels. The one or more input channels may be connected to the one or more sensors, and the one or more output channels may be connected to the relay control module and the warning indicator.

In another aspect of the disclosure, a marine barge monitoring method to monitor remotely operational conditions of a pump engine and a pump mounted on a marine barge during offloading operation of barge petroleum product content may include receiving, by a status monitoring and communication device having one or more processors and a device memory, and being connected to a power source of the marine barge, data signals indicative of the operational conditions of the pump engine and the pump from one or more sensors; storing the received data signals as monitored sensor data in the device memory of the status monitoring and communication device; retrieving, by one or more remotely positioned monitoring servers positioned remote from the marine barge, the monitored sensor data from the device memory of the status monitoring and communication device positioned remote from the marine barge; filtering the retrieved monitored sensor data according to one or more user-selectable filter criteria; and displaying, by the one or more remotely positioned monitoring servers, a real-time visual representation of the filtered retrieved monitored sensor data on a display associated with the one or more remotely positioned monitoring servers thereby to report the operational conditions of the pump engine and the pump and thereby to define a personnel dashboard interface to monitor the pump engine and the pump during the offloading operation of the petroleum product contents.

In one embodiment, for example, the one or more determinations, by the input/output module in communication with the warning indicator, that the one or more preselected thresholds have been met, may include receiving, by the input/output module, a pump engine rotational speed signal associated with a rotating component of the pump engine from the one or more sensors, the received pump engine rotational speed signal being corresponding to a value of a pump engine rotational speed; comparing the value of the pump engine rotational speed to the preselected thresholds; determining whether the value of the pump engine rotational speed exceeds the one or more preselected thresholds; and generating a local alarm signal to activate the warning indicator, thereby alerting the barge offloading operation personnel when the pump engine rotational speed exceeds the one or more preselected thresholds when offloading the petroleum product contents.

In another embodiment, the one or more determinations, by the input/output module in communication with the warning indicator, that the one or more preselected thresholds have been met, may include receiving a pump pressure signal associated with the pump from the one or more sensors, the received pump pressure signal being corresponding to a value of a pump pressure, the pump being positioned to transfer the petroleum product contents from the marine barge to one or more product storages; comparing the value of the pump pressure to the one or more preselected thresholds; determining whether the value of the pump pressure associated with the pump is less than the one or more preselected thresholds; and generating a local alarm signal to activate the warning indicator, thereby alerting the barge offloading operation personnel when the pump pressure drops below the one or more preselected thresholds when offloading the petroleum product contents.

In another aspect of the disclosure, a kit to monitor remotely operational conditions of a pump engine and a pump mounted on a marine barge during offloading operation of barge petroleum product contents, may include a container. The kit may also include a housing positioned in the container, configured to be connected to the marine barge, and configured to monitor the pump engine and the pump when connected to the marine barge. In one embodiment, for example, the kit may include an electronic assembly positioned in the housing. The electronic assembly may include a relay control module and an input/output module. The kit may further include a status monitoring and communication device positioned in the container and configured to be communicatively connected to the relay control module, the status monitoring and communication device having one or more processors, the status monitoring and communication device being configured to be connected to a power source of the marine barge, positioned to be connected to receive generated data signals from one or more sensors, and transmit the generated data signals therefrom. Further, the kit may also include a warning indicator positioned in the container, configured to be connected to the electronic assembly and responsive to one or more determinations that one or more preselected thresholds, associated with the operational conditions of the pump engine and the pump and being sensed by the one or more sensors, have been met thereby indicating an improper operational condition, and further being positioned to be configured to provide a visual warning to barge offloading operation personnel when offloading the petroleum product contents.

In another aspect of the present disclosure, a fleet monitoring system to monitor remotely operational conditions of a pump engine and a pump mounted on each of a plurality of marine barges defining a fleet during offloading operation of barge petroleum product contents, may include a housing. The housing may be connected to each of the plurality of marine barges in the fleet in a position to monitor the pump engine and the pump and having an electronic assembly positioned in the housing.

The fleet monitoring system may also include one or more sensors communicatively connected to the relay control module via the input/output module. The one or more sensors may be positioned to sense physical properties associated with the pump engine and the pump and generate data signals indicative of the operational conditions of the pump engine and the pump.

In one embodiment, for example, the fleet monitoring system may further include a status monitoring and communication device communicatively connected to the relay control module. The status monitoring and communication device may include one or more processors. The fleet monitoring system may be connected to a power source of each of the plurality of marine barges in the fleet and may be positioned to receive the generated data signals from the one or more sensors.

In yet another disclosed embodiment, the fleet monitoring system may include a warning indicator connected to the electronic assembly and responsive to one or more determinations that one or more preselected thresholds, associated with operational conditions of the pump engine and the pump and being sensed by the one or more sensors, have been met thereby indicating an improper operational condition.

According to one embodiment of the present disclosure, the fleet monitoring system may further include one or more remotely positioned monitoring servers having a memory positioned remote from each of the plurality of marine barges and in communication with the status monitoring and communication device. The one or more remotely positioned monitoring servers may be configured to store the generated data signals from the one or more sensors as monitored sensor data, and display a real-time visual representation of the monitored sensor data on a display associated with the one or more remotely positioned monitoring servers thereby to report in real time the operational conditions of the pump engine and the pump and thereby define a dashboard interface to monitor the pump engine and the pump during the offloading operation of the petroleum product contents.

In one embodiment, for example, the one or more determinations, by the input/output module in communication with the warning indicator, that the one or more preselected thresholds have been met, may include receiving a pump pressure signal associated with the pump from the one or more sensors, the received pump pressure signal being corresponding to a value of a pump pressure, the pump being positioned to transfer the petroleum product contents from each of the plurality of marine barges in the fleet to one or more product storages, comparing the value of the pump pressure to the one or more preselected thresholds, determining whether the value of the pump pressure associated with the pump is less than the one or more preselected thresholds, and generating a local alarm signal to activate the warning indicator, thereby alerting the barge offloading operation personnel when the pump pressure drops below the one or more preselected thresholds when offloading the petroleum product contents.

In another embodiment, the memory of the one or more remotely positioned monitoring servers further may include a grouping module, for example. The grouping module may be configured to segment the monitored sensor data into one or more groupings based on the physical properties associated with the pump engine and engine of each of the plurality of marine barges in the fleet; and transmit the one or more segmented groupings to one or more groups of maintenance personnel responsible for maintaining a lifecycle management of the pump engine and the engine based on the physical properties associated with the pump engine and the engine of each of the plurality of marine barges.

BRIEF DESCRIPTION OF DRAWINGS

The foregoing aspects, features, and advantages of the present disclosure will be further appreciated when considered with reference to the following drawings:

FIG. 3A is a schematic illustrating an example of a housing, according to an embodiment of the present disclosure.

FIG. 3B is a block diagram illustrating an example of internal components, including an electrical assembly of a housing, according to an embodiment of the present disclosure.

FIGS. 4B-4C are tables illustrating an example of monitored sensor data, according to an embodiment of the present disclosure.

FIG. 7E is a flow diagram illustrating an example of a process for segmenting data into groupings, according to an embodiment of the present disclosure.

FIG. 8 is a block diagram of an example of a kit to monitor remotely operational conditions of a pump engine and a pump mounted on a marine barge during offloading operation of barge petroleum product contents, according to an embodiment of the present disclosure.

DETAILED DESCRIPTION OF THE DISCLOSURE

The foregoing aspects, features, and advantages of the present disclosure will be further appreciated when considered with reference to the following description of the following embodiments and accompanying drawings. In describing the following embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present disclosure are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

Figure 1A:
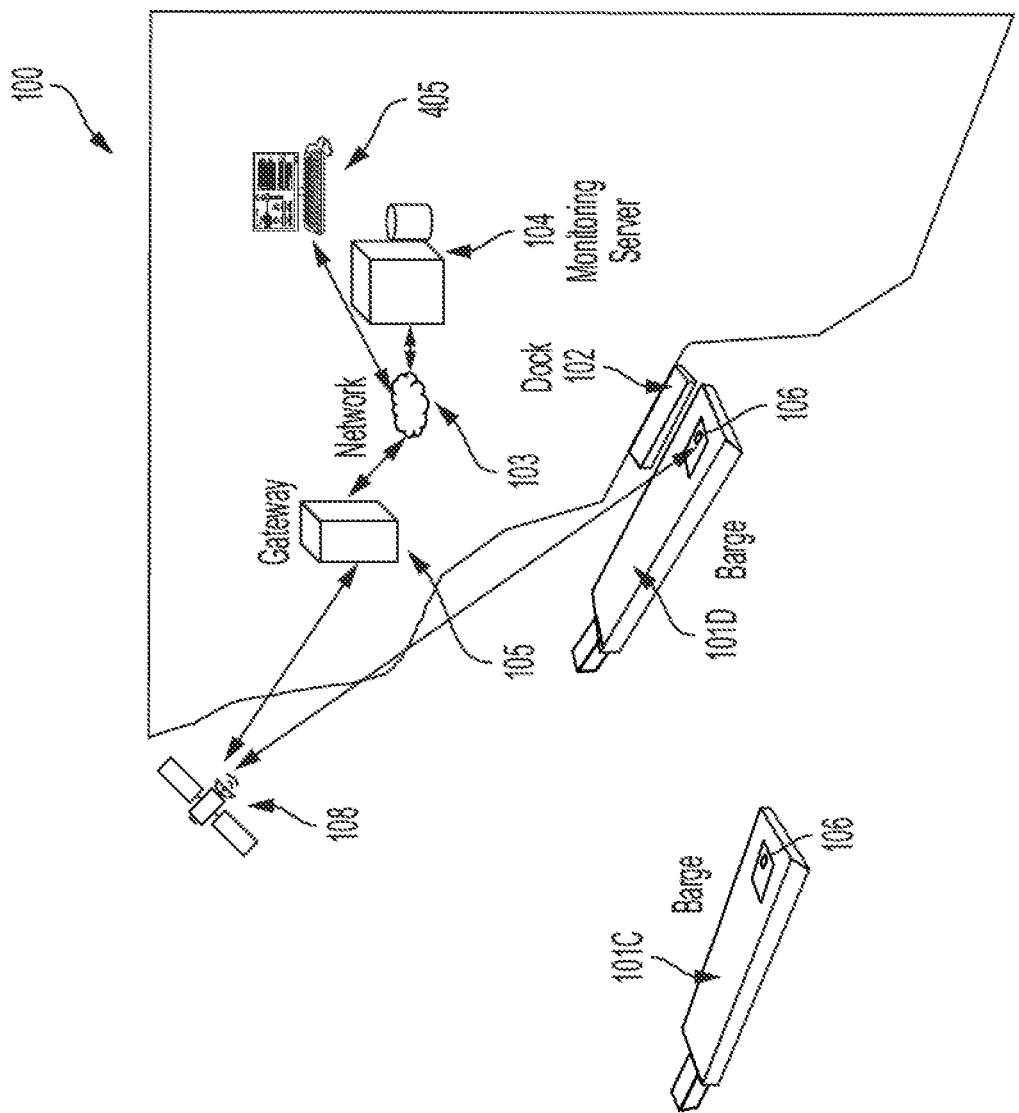
FIG. 1A is a schematic diagram illustrating an example of an environment in which the marine barge monitoring system and the associated methods may be implemented, according to an embodiment of the present disclosure.

As illustrated in FIG. 1A, a marine barge 101D may be positioned adjacent a dock 102 during offloading operation of barge petroleum product contents. The marine barge (e.g., 101D) may be used to move petroleum product out of the production areas to refineries and terminals via an inland river or the intra-coastal waterway, for example. In one embodiment, petroleum product may include light products, heavy oils, crude oil, renewable fuels, chemicals, and feedstocks, as will be understood by those skilled in the art. Although there is one marine barge 101D positioned adjacent the dock 102 shown, a plurality of barges defining a fleet 101A, 101B, 101C (see FIG. 1A) may be used to transport petroleum product to the refineries, and positioned adjacent the dock 102 during the offloading operation of barge petroleum product contents. The marine barge may hold 10,000 to 30,000 barrels of oil and may have speeds of about 4 to 5 miles per hour (mph). A pump engine and a pump may be mounted on the marine barge 101D. For example, the pump engine 503, 513, 533 and the pump 501, 511, 531 may be illustrated in FIGS. 5A-5C. The pump engine and the pump may be used for marine transfer operations conducted at the dock 102 (see FIG. 1C). FIG. 1C illustrates an example of offloading operation of barge petroleum product contents from a marine barge (e.g., 101D) positioned adjacent a dock 102. In one embodiment, for example, a pipe 118 may be in fluid communication with a product storage 112 positioned at a predetermined location from the dock 102. The pipe may be used as a conduit to transfer the barge petroleum products contents from the marine barge 101D having a pump engine 114 and a pump 116 during the offloading operations, as will be understood by those skilled in the art. The pump 116 may be used with the pump engine 114 to drive the discharge of the petroleum product contents from one or more liquid cargo compartments associated with the marine barge 101D. In one embodiment, a marine barge monitoring system 106 to monitor remotely operational conditions of a pump engine and a pump mounted on a marine barge during offloading operation of barge petroleum product contents may be positioned adjacent the pump engine and the pump. The marine barge monitoring system 106 may be communicatively coupled to a remotely positioned gateway 105 over a satellite or cellular connection 108. The remotely positioned gateway 105 may be communicatively coupled to one or more remotely positioned monitoring servers 104 via network 103. In one embodiment, for example, the remotely positioned gateway 105 may include the IBM Softlayer Cloud on which AssetLink Device Manager middleware system may be hosted. AssetLink Device Manager middleware system may be configured to decode, normalize, and maintain monitored sensor data, for example. Network 103 may be any type of networks such as a wide area network (WAN) such as the Internet, a local area network (LAN), a cellular network, a satellite network, or a combination thereof, wired or wireless. The one or more remotely positioned monitoring servers 104 may be any kind of servers or a cluster of servers, such as Web or cloud servers, application servers, backend servers, or a combination thereof. The one or more remotely positioned monitoring servers 104 may be data analytics servers, tracking server, monitoring servers, or reporting servers, among others as will be understood by those skilled in the art.

Figure 1B:
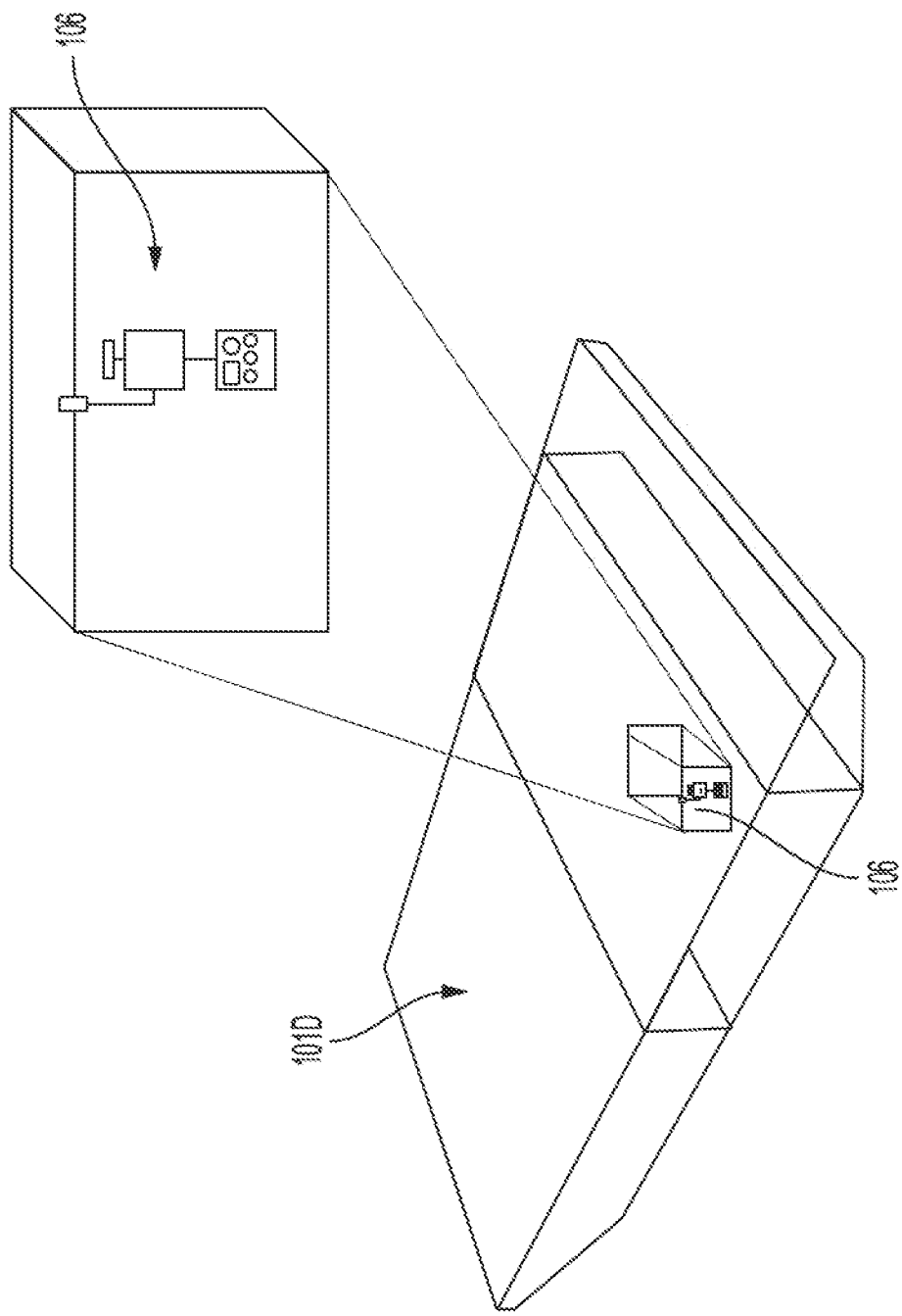
FIG. 1B is a schematic diagram illustrating an example of a marine barge monitoring system installed on the marine barge, according to an embodiment of the present disclosure.
Figure 1C:
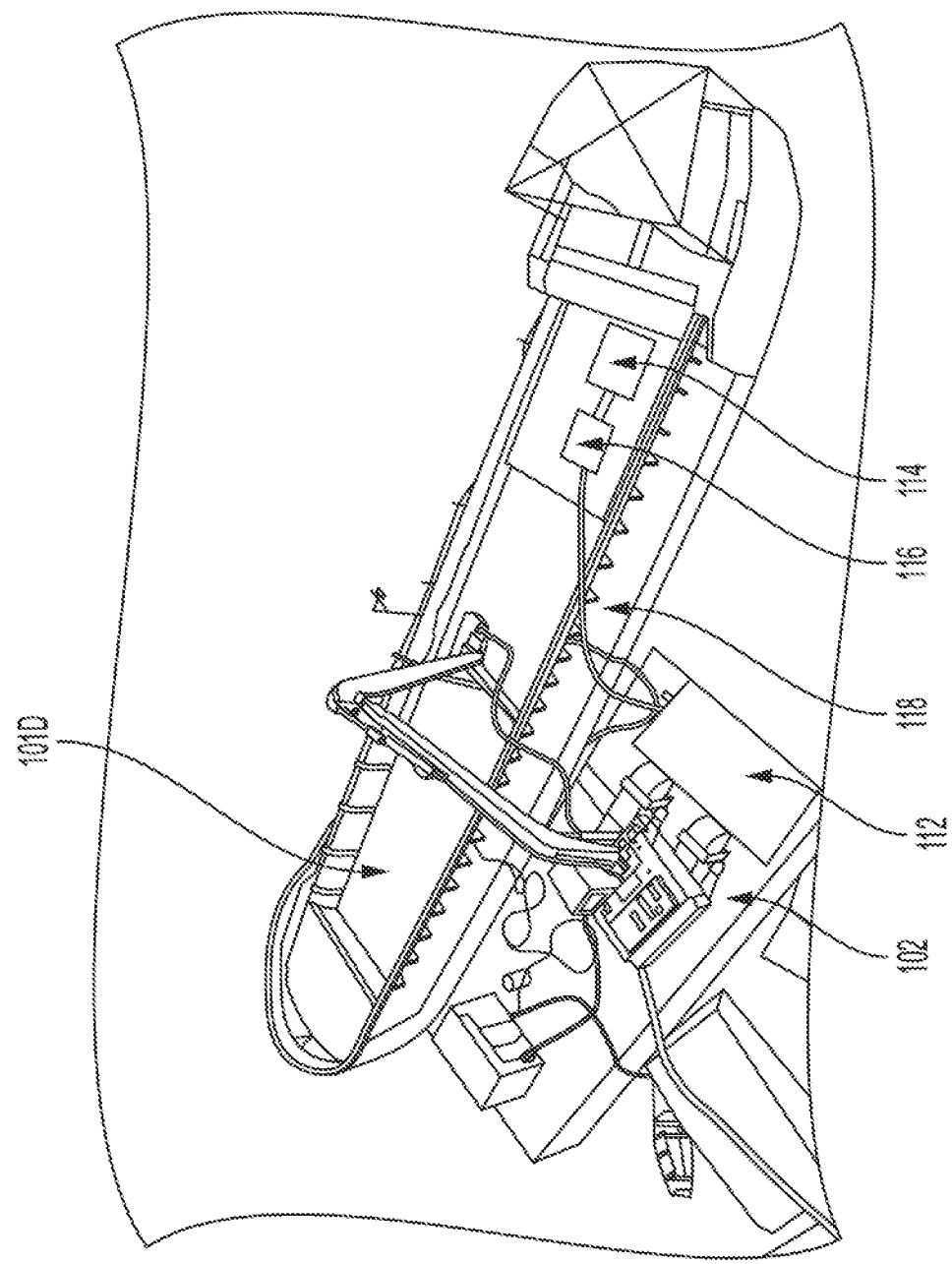
FIG. 1C is an illustration of exemplary offloading operations in which the marine barge system and the associated methods may be implemented, according to an embodiment of the present disclosure.

FIG. 1B, for example, illustrates an embodiment of a marine barge monitoring system 106 may be positioned adjacent the pump engine and the pump mounted on a marine barge 101D. According to one embodiment of the present disclosure, for example, the marine barge monitoring system 106 may be used for monitoring the pump engine and the pump on the marine barges within Marathon Petroleum Corporation's fleet of barges. The Marathon Petroleum Corporation's fleet of barges may transport light products, heavy oils, crude oil, renewable fuels, chemicals, and feedstocks to and from inland refineries and terminals throughout the Midwest and Gulf Coast regions. The embodiment of the system may prevent damages to the pump engine and the pump and to ensure the pump engine and the pump are operating within proper parameters and conditions. The data generated by the system may also be leveraged by maintenance to diagnose issues, to perform analysis, and to schedule maintenance for the pump engine and the pump on the marine barge.

Figure 2:
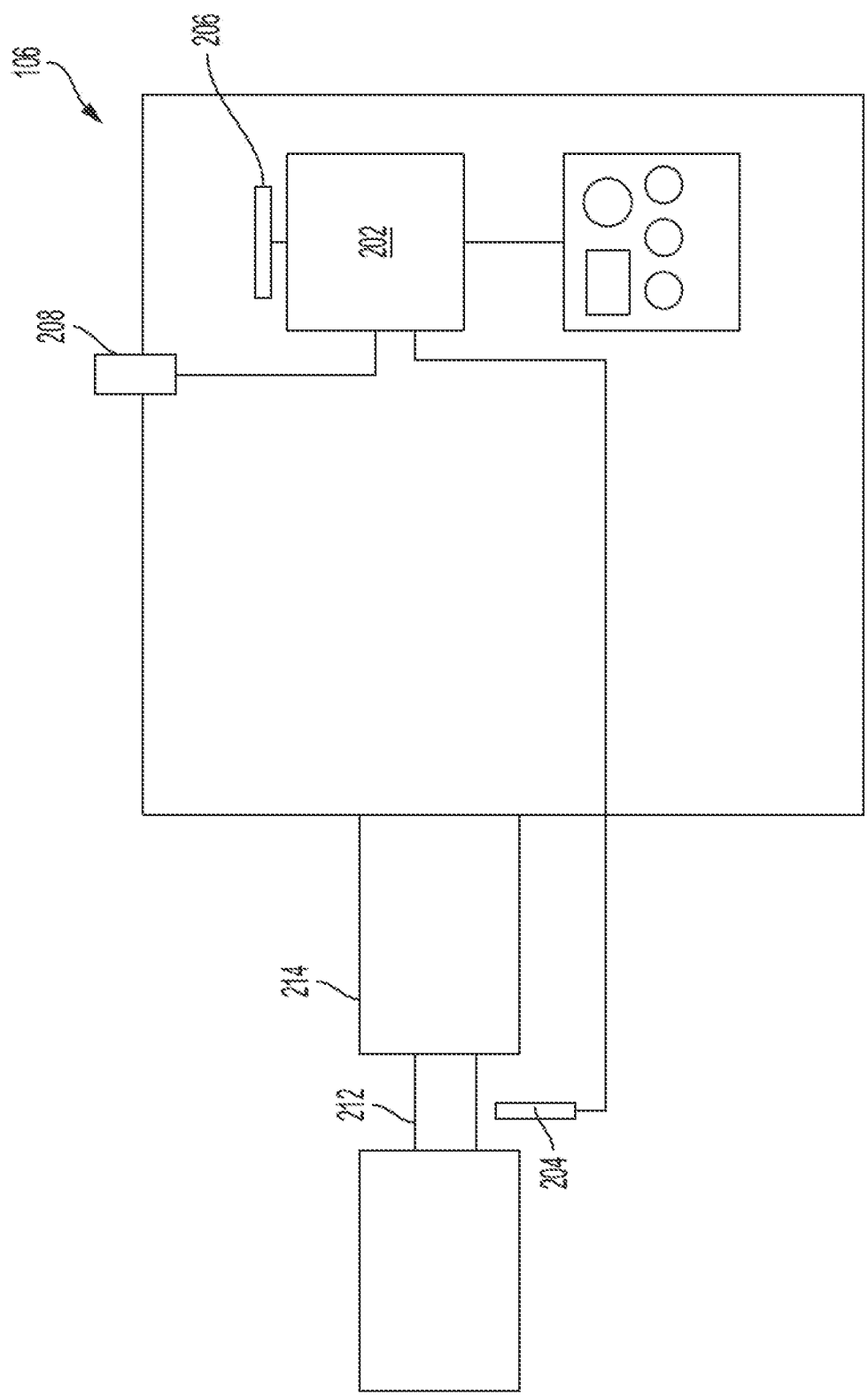
FIG. 2 is a block diagram illustrating an example of a marine barge monitoring system, according to an embodiment of the present disclosure.

As illustrated in FIG. 2, in one embodiment, for example, a marine barge monitoring system 106 to monitor remotely operational conditions of a pump engine 214 and a pump 212 mounted on a marine barge during offloading operation of barge petroleum product contents may include, but it is not limited to, a housing 202, one or more sensors 204, a status monitoring and communication device 206, and a warning indicator 208. The marine barge monitoring system 106 may also include one or more remotely positioned monitoring servers 104 as illustrated in FIG. 1A.

In one embodiment, a housing 202 may be connected to the marine barge in a position to monitor the pump engine and the pump. As shown in FIG. 3A, the housing 202 may include an electronic assembly 302 positioned in the housing 202. The housing 202 may be a ruggedized enclosure and include a protective cover 304 and a lock 306. In one embodiment, for example, the electronic assembly 302 may include a relay control module 308 and an input/output module 310 as illustrated in FIG. 3B. The electronic assembly 302 may be communicatively coupled to the input/output module 310 via a bus, a network, or a combination thereof. For example, the electronic assembly 302 may be communicatively coupled to the input/output module 310 via RS-485 serial communication. RS-485 serial communication is a standard defining the electrical characteristics of drivers and receivers for use in serial communications systems. RS-485 serial communication allows multiple devices (up to 32) to communicate at half-duplex on a single pair of wires, plus a ground wire, at distances up to 4000 feet. The input/output module 310 may include a known input/output module suitable for data acquisition and process monitoring, such as an input/output module manufactured by Acromag or any of various input/output modules as will be understood by the person skilled in the art. For example, Acromag's BusWorks 900 MB series is a collection of analog and discrete input/output modules featuring flash microcontrollers with Modbus-Remote Terminal Unit (RTU) network communication. Acromag's BusWorks 900 MB series other features may include high-speed RS-485 communication (allows data transfers up to 115K baud), Modbus RTU protocol interfaces, high channel density, twelve inputs/outputs/bidirectional input/output channels, and menu-based Windows® configuration software as will be understood by the person skilled in the art. Additionally, Acromag's BusWorks 900 MB series may monitor discrete levels of various devices, provide on/off control capabilities, and transmit discrete data to other control systems. Acromag's BusWorks 900 MB series may also monitor DC or thermocouple sensor inputs and provide alarm outputs if conditions exceed user-defined limits, for example. Acromag's BusWorks 900 MB series may also include four analog input channels and four discrete outputs for independent local alarms.

In one embodiment, the one or more sensors 204 may be communicatively connected to the relay control module 308 via the input/output module 310. The one or more sensors 204 may be positioned to sense physical properties associated with the pump engine and the pump and generate data signals indicative of the operational conditions of the pump engine and the pump. The one or more sensors 204, for example, may include an engine revolution per minute (RPM) sensor, a shaft RPM sensor, a pump pressure sensor, an engine coolant temperature sensor, an engine oil viscosity sensor, an engine oil pressure sensor, and an engine battery volts sensor. In various embodiments, the one or more sensors 204 may be implemented using various cablings (20', 50'), a cable gland, a mounting, a sensor assembly, among others as will be understood by those skilled in the art. In one embodiment, for example, the one or more physical properties may include, for example, engine revolutions per minute (RPM), shaft RPM, pump RPM, pump pressure, engine coolant temperature, engine water temperature, engine oil viscosity, engine oil pressure, engine start failure, and engine battery voltage. In one embodiment, the engine coolant temperature sensor may include Allen-Bradley 837 electromechanical temperature control manufactured by Allen-Bradley which may be equipped with a vapor pressure technology to sense changes in temperature. Additionally, Allen-Bradley 837 electromechanical temperature controls may include an adjustable temperature range from −60° F. to 570° F., an adjustable differential from 2° F. to 87° F., a wide variety of contact arrangements, and packing glands in brass and thermostat wells in either brass or stainless steel, as will be understood by those skilled in the art. In another embodiment, a pump pressure sensor and an engine oil pressure may include Allen-Bradley 836/836T electromechanical pressure control equipped with National Electrical Manufacturers Association (NEMA)-style switches configured for AC loads and DC loads over 250 mA. Allen-Bradley 836 electromechanical pressure control may include an adjustable differential range from 0.2 to 125 psi, copper alloy or stainless steel bellows, and standard and custom refrigeration controls, as will be understood by those skilled in the art. Allen-Bradley 836T electromechanical pressure control may include an externally adjustable differential range from 1.5 to 3000 psi, bellows type available in copper alloy or stainless steel, and piston type actuators with or without seal, as will be understood by those skilled in the art. In yet another disclosed embodiment, a pressure sensor may include Allen-Bradley 836P solid-state pressure sensor featuring display model with an embedded IO-Link 1.1 communications protocol, which may allow for enhanced integration with The Connected Enterprise while delivering data directly into a control system. The embedded IO-Link 1.1 communications protocol may be configured to enable sensors to share device identity, parameters, real-time diagnostics, and process data with the control system when connected to an IO-Link master. Additionally, Allen-Bradley 836P solid-state pressure sensor may feature a non-display model with a pressure range from −1 to 10,000 psi, analog outputs with a current range from 4 to 20 mA, as will be understood by those skilled in the art. In one embodiment, an RPM/shaft RPM sensor may include Allen-Bradley 871TM 3-Wire DC short barrel tubular sensor featuring the embedded IO-Link 1.1 communications protocol functionality on 8 mm, 12 mm, 18 mm and 30 mm models. The IO-Link 1.1 communications protocol may allow sensors to integrate with The Connected Enterprise, delivering data from the sensor directly into a control system in an easy-to-use manner via an IO-Link Master and EtherNet/IP™, as will be understood by those skilled in the art. In another embodiment, the RPM/shaft RPM sensor may further include Rockwell Automation 871C PROX-TD001 Tubular Analog Sensor featuring solid-state devices configured to sense the presence of ferrous and nonferrous metal objects without touching them. Rockwell Automation 871C PROX-TD001 Tubular Analog Sensors may feature a 10V sourcing analog output proportional to a sensing distance, as will be understood by those skilled in the art.

In another embodiment, the embodiments of systems, methods, and kit may be implemented to carry out one or more operations, for example, product leak detection, level monitoring, process/surface/product/equipment temperature monitoring, vibrations, man overboard, man-down, corrosion detection, electrical system monitoring, cooling water leak detection, hydraulic fluid leak detection, vapor detection, product flow, personnel/specific zone monitoring, object detection, liquid detection, ultrasonic audio detection, abnormal noise detection, precipitation/temperature/barometric pressure/wind speed monitoring, product/personnel/operator identification, and various data analysis related to the one or more sensors 204 installed on the marine barges, among others as will be understood by those skilled in the art.

In one embodiment, for example, the one or more sensors 204 that may be used in performing product leak detection may include a gas detector sensor and a liquid sensor, as will be understood by those skilled in the art. In another embodiment, the liquid sensor may be used in performing cooling water leak detection and hydraulic fluid leak detection, as will be understood by those skilled in the art. Additionally, the one or more sensors 204 may include, for example, a thermocouple sensor, an ambient temperature sensor, and a thermal sensor. The thermocouple sensor may be used for sensing surface temperature and product temperature, as will be understood by those skilled in the art. The thermal sensor, for example, may be used for sensing equipment temperature and detecting a man overboard, as will be understood by those skilled in the art.

In yet another disclosed embodiment, for example, the one or more sensors 204 may also include an accelerometer sensor configured to sense vibration of an equipment, as will be understood by those skilled in the art. In one embodiment, the one or more sensors 204 that may be used in performing corrosion detection may include an ultrasonic thickness monitoring sensor. In one embodiment, for example, the one or more sensors 204 may additionally include an ultrasonic sensor (product level monitoring), a pressure sensor, a pressure differential sensor, a current sensor (electrical system monitoring), an infrared sensor (vapor detection), a limit switch/contact switch (valve position, lever position, hatch closed/open), a flow meter sensor (product flow monitoring), a motion sensor (triggering alert for personnel in specific zones of the marine barge), and a proximity sensor (object detection, liquid detection), among others as will be understood by those skilled in the art.

In another embodiment, the one or more sensors 204 may further include a video sensor, an audio sensor (ultrasonic audio detection, abnormal noise detection), a Reid Vapor Pressure (RVP) sensor, a weather station sensor (precipitation detection, temperature detection, barometric pressure detection, wind speed detection), and a barge listing sensor, as will be understood by those skilled in the art.

In one or more embodiments, for example, the one or more sensors 204 may include a specific gravity sensor (product identification), a void leak detection sensor, a GPS (location monitoring), a Lenel card reader, an operator identification sensor, and an exhaust temperature sensor, among others as will be understood by those skilled in the art. Additionally, the one or more sensors 204 may include a filter pressure/differential pressure sensor for monitoring an air filter, an oil filter, and a fuel filter, for example, as will be understood by those skilled in the art.

According to an embodiment of the present disclosure, the one or more sensors 204 may also include, for example, a pressure relief valve sensor configured to report to a contractor the number of time relieved and/or detect a pressure at a pressure vacuum (PV valve), as will be understood by those skilled in the art. In another embodiment, for example, the one or more sensors 204 may further include, a high and over fill alarm sensor for marine barges, a void bilge alarm system including four gas and water detection, and a tank level sensor. The tank level sensor may be configured to work with engine fuel tanks, slop tanks, and cargo compartments, as will be understood by those skilled in the art.

In another embodiment, the one or more sensors 204 may additionally include known sensors for kiosk applications that may replace a variety of paperwork, procedures, documentations, maintenance records, among others as will be understood by those skilled in the art. The one or more sensors 204, for example, may further include a Hydrogen Sulfide detector (H2S) and/or four gas meters on a deck equipped with a visual indicator for alarming the personnel when a level of Hydrogen Sulfide reaches a predetermined alarm set point, as will be understood by those skilled in the art. The visual indicator associated with the Hydrogen Sulfide detector (H2S) and/or four gas meters may indicate battery limitations and issues, as will be understood by those skilled in the art.

In one embodiment, for example, the electronic assembly 302 also may include a DC-DC converter as will be understood by those skilled in the art. The DC-DC converter, for example, may provide a regulated DC voltage by regenerating voltages so that the load is always supplied with a regulated DC voltage, even in the case of long cable lengths. DC-DC converters may be used to alter the voltage level or enable the creation of independent supply systems such as for electrical isolation. For example, the DC-DC converter may include DC/DC converters-MINI-PS-12-24DC/5-15DC/2-2320018, manufactured by Phoenix Contact.

In another embodiment, for example, the electronic assembly 302 further may include an intrinsic safety (IS) barrier. For example, the IS barrier may prevent the transfer of unacceptably high energy from the safe area into the hazardous area. An example of the IS barrier may include the Zener barrier featuring two channels, manufactured by Pepperl+Fuchs Inc., as will be understood by those skilled in the art.

In one or more embodiments, for example, the electronic assembly 302 may additionally include a control board, a fuse set (0.063A, 1A, 1A, 3A, 5A), a proximity bias resistor (10K), a fuse holder, a terminal block, Gore-Vex vent, a Y-cable 5' external Murphy to internal Murphy, an internal Murphy harness, a Murphy gauge mounting plate, a strobe mount conduit assembly, among others as will be understood by those skilled in the art.

Figure 3C:
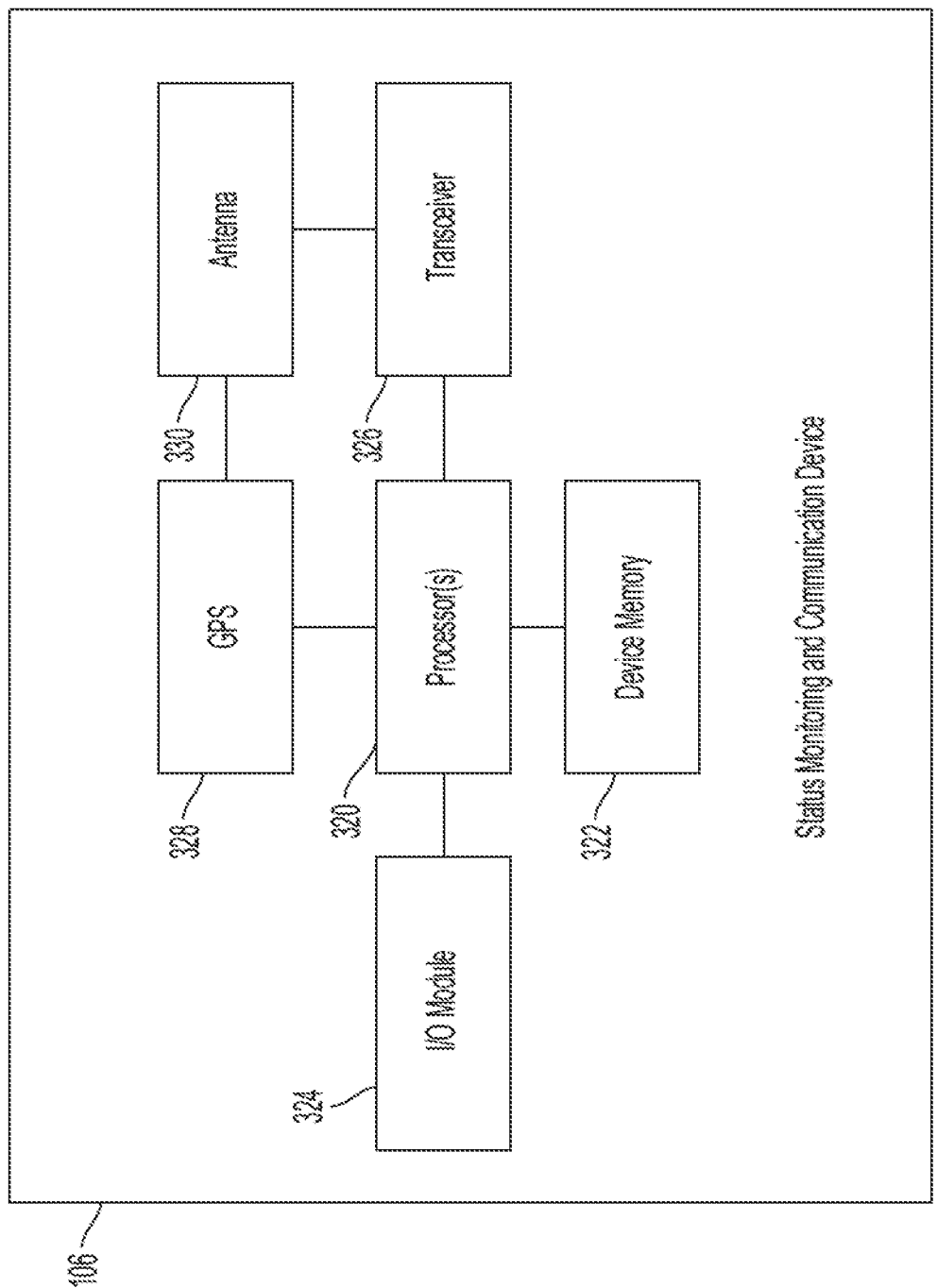
FIG. 3C is a block diagram illustrating an example of status monitoring and communication device, according to an embodiment of the present disclosure.
Figure 3D:
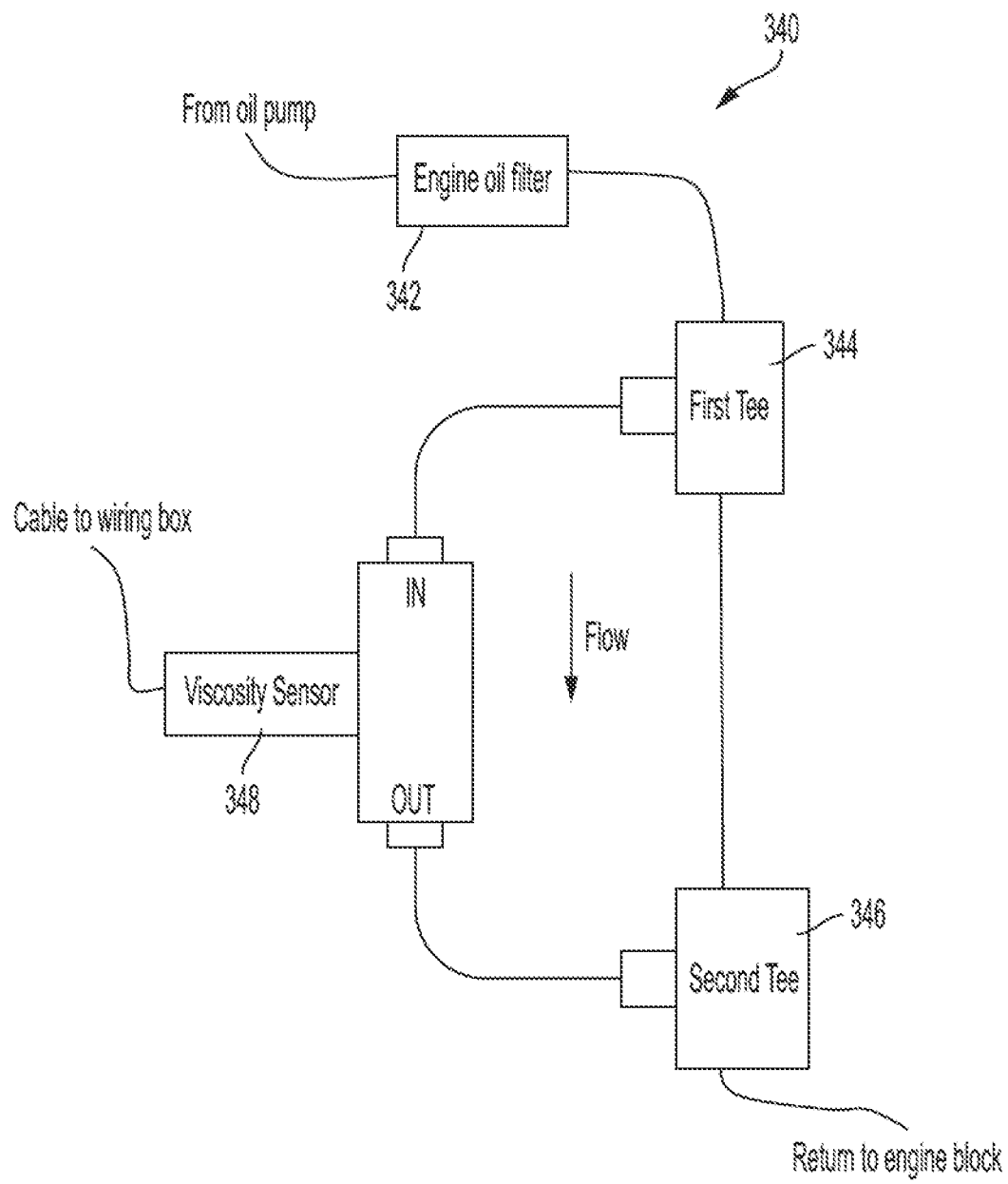
FIG. 3D is a block diagram illustrating an example of an installation of viscosity sensor, according to an embodiment of the present disclosure.
Figure 3E:
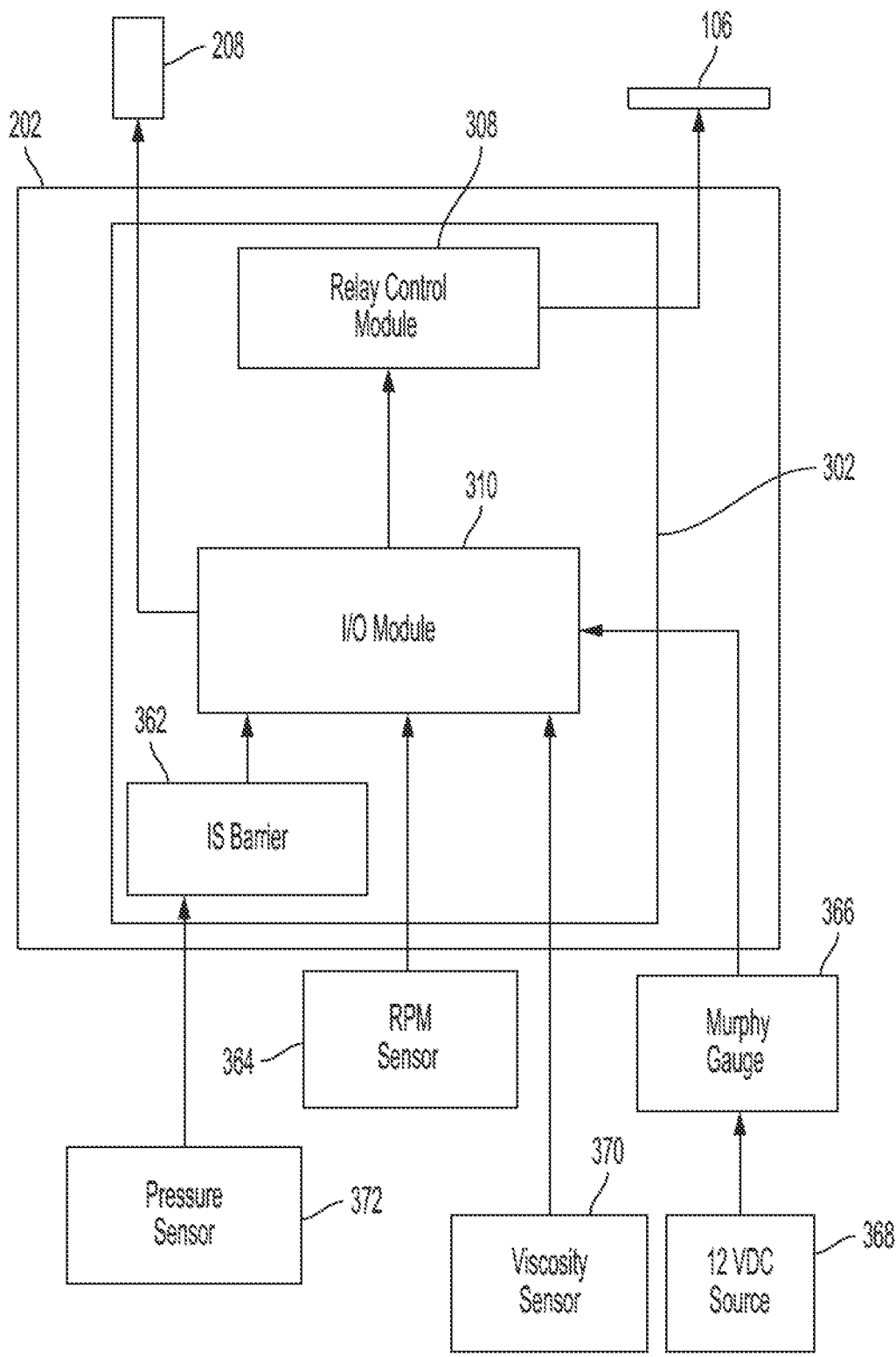
FIG. 3E is a block diagram illustrating an example of an electrical connection to the marine barge system, according to an embodiment of the present disclosure.

In one embodiment, for example, the housing 202 as depicted in FIG. 3E may include an electronic assembly 302 having a relay control 308, an input/output module 310, and an IS barrier 362. The input/output module 310 may include one or more input channels and one or more output channels. The one or more input channels may be connected to the one or more sensors 204 such as an RPM sensor 364 and a viscosity sensor 370. In one embodiment, for example, the one or more input channels may be connected to the IS barrier 362 and a Murphy gauge 366. As further illustrated in FIG. 3E, a pressure sensor 372 may be connected to the IS barrier 362. A 12 VDC source 368 may be connected to the Murphy gauge 366 providing a hard line power. In one embodiment, for example, a J1939 information input source may be wired from the Murphy Gauge 366. The J1939 information input source may transfer data including, voltage oil pressure, water temperature, and engine RPM from the Murphy Gauge 366, as will be understood by those skilled in the art. The transferred data from the J1939 information input source may be in units provided by the Murphy Gauge 366. The one or more output channels may be connected to the relay control module 308 and the warning indicator 208. The relay control module 308 may be connected to a status monitoring and communication device 106. In one embodiment, for example, the Murphy Gauge 366 may include PowerView PV101 display configured to enable barge offloading operation personnel to view standard engine and transmission parameters and active/stored trouble codes, as will be understood by those skilled in the art. PowerView PV101 display may be configured to display a single or a four-parameter simultaneous display with text descriptions for fault conditions. The Murphy Gauge 366 may additionally include a Murphy Gauge assembly, a 5'Y-cable, a cable gland, and a mounting plate, as will be understood by those skilled in the art.

As illustrated in FIG. 3D, in one embodiment, a viscosity sensor 348 may be connected to an engine oil filter 342 in a bypass configuration on an engine return line. The viscosity sensor 348 may be installed downstream of the engine oil filter 342 to ensure clean oil is passed through the viscosity sensor 348. The viscosity sensor 348 may require a continuous flow of oil, but the viscosity sensor 348 may present some small resistance to the flow of oil. Therefore, the viscosity sensor 348 may be installed as a "bypass" from the regular stream of oil. Two tees including a first tee 344 and a second tee 346 may be used. A one-foot hose may be installed between the first tee 344 and the second tee 346. The one-foot hose may be routed from the first tee 344 to the IN section on the viscosity sensor 348. The one-foot hose may be routed from the OUT section on the viscosity sensor 348 to the second tee 346. In one embodiment, the viscosity sensor 348 may include density+viscosity+temperature sensor manufactured by Devil with features such as, USB, RS 232, RS 485, Modbus TCP communication protocols, and MesoScale® sensing technologies, as will be understood by those skilled in the art. The Devil density+viscosity+temperature may be suitable for one or more fluids such as light fuels (SP95, SP98), Kerosene, Naphtha, gasoline, mid/heavy fuel oils, biodiesel, GPL, GNL, Ethanol, as will be understood by those skilled in the art.

FIG. 3C, for example, illustrates a status monitoring and communication device 106 may be communicatively connected to the relay control module 308. The relay control module 308 may include a known relay control module, such as Acromag BusWorks XT multi-channel optocoupler and interposing relay modules manufactured by Acromag, as will be understood by those skilled in the art. Acromag BusWorks XT may connect discrete field devices to measurement and control system input/output modules such as Acromag BusWorks 900 MB series. Acromag BusWorks XT is suitable to monitor or control inductive and other high-power loads effectively and with reduced risk, such as those loads associated with motors, valves and solenoids with control system input/output modules that only support low-level DC signals. Additionally, Acromag BusWorks XT provides an enhanced and isolated interface between high-energy field devices and sensitive control system input/output modules to reduce associated risks as will be understood by those skilled in the art. Acromag BusWorks XT may drive audible or visual alarms for operations with stack lights, bells, whistles, lights, and horns.

In one embodiment, the status monitoring and communication device 106 may include one or more processors 320, a device memory 322, I/O module 324, a transceiver 326, a GPS 328, and an antenna 330. The status monitoring and communication device 106 may be connected to a power source of the marine barge and may be positioned to receive the generated data signals from the one or more sensors 204. The status monitoring and communication device 106 may be positioned to transmit the generated data signals therefrom. In one embodiment, the GPS 328 may be configured to read and transmit a GPS location associated with the status monitoring and communication device 106 every three hours. In one embodiment, the status monitoring and communication device 106 may read and transmit the GPS location every three hours while no hard line power may be present, as will be understood by those skilled in the art. The status monitoring and communication device 106 may include AP4 Cellular+Satellite manufactured by AssetLink, as will be understood by those skilled in the art. The AP4 Cellular+Satellite may provide two-way asset tracking and sensor monitoring solutions, and may be designed for two-way communication with unpowered assets. The AP4 Cellular+Satellite completely may be self-contained as will be understood by those skilled in the art. Additionally, the AP4 Cellular+Satellite features may include two analog or digital input/outputs, an RS-485 Interface, MODBUS or CANBUS/J1939 options, an internal Geofence options, and magnetic and door mounting brackets. The AP4 Cellular+Satellite may operate with a satellite network such as Iridium with satellite data service such as Iridium Short Burst Data (SBD). The AP4 Cellular+Satellite may be controlled Over-The-Air (OTA) to change reporting schedules and behavior, control sensor endpoints, geofences, alarm thresholds, and deliver firmware upgrades. The AP4 Cellular+Satellite may operate with the embodiments of the system when the ambient temperature may be between −4° F. to 158° F., as will be understood by those skilled in the art. Additionally, The AP4 Cellular+Satellite may be used with a National Electrical Manufacturers Association (NEMA)–4× or comparable and UV-resistant enclosure. The AP4 Cellular+

Satellite may be certified for a minimum of Class 1, Division 2 hazardous location, as will be understood by those skilled in the art.

In one embodiment, for example, a transceiver 326 may be in communication with the one or more processors 320 associated with the status monitoring and communication device 106. The transceiver 326 associated with the status monitoring and communication device 106 may be configured to transmit the generated data signals as one or more communication messages in a short burst data format to a remotely positioned gateway 105 via a satellite network. In one embodiment, short burst data format may refer to a series of bytes or characters encapsulated in a message specially formatted for transmission over a low bandwidth satellite network service as will be understood by those skilled in the art. A satellite network, such as Iridium with satellite data service such as Iridium Short Burst Data (SBD), may be used for the data transmission between the status monitoring and communication device 106 and the remotely positioned gateway 105. Iridium, for example, operates Time Division Multiple Access (TDMA) or Frequency Division Multiple Access (FDMA) as a communication access method. In addition, the frequency spectrum being employed, for example may be in the range of approximately 1616 to 1626.5 MHz as will be understood by those skilled in the art.

FIG. 3B, in some embodiments, for example, also illustrates the status monitoring and communication device 106 may be connected to and in communication with the input/output module 310 via the relay control module 308 positioned in the housing 202. The housing 202 may be positioned adjacent a location of the pump engine and the pump on the marine barge. The input/output module 310 may include one or more input channels and one or more output channels. The one or more input channels may be connected to the one or more sensors 204, and the one or more output channels may be connected to the relay control module 308 and the warning indicator 208.

A warning indicator 208 (see FIG. 2), for example, may be connected to the electronic assembly 302 and may be responsive to one or more determinations that one or more preselected thresholds, associated with operational conditions of the pump engine and the pump and being sensed by the one or more sensors 204, have been met thereby indicating an improper operational condition. The warning indicator 208 further may be positioned to provide a visual warning to barge offloading operation personnel when offloading the petroleum product contents. In one embodiment, for example, the warning indicator 208 may include a strobe light as will be understood by those skilled in the art. The strobe light may be mounted on a strobe mount to provide a flashing or warning type of strobe for offloading operation of the petroleum product contents. In another embodiment, the warning indicator 208 may include 105 Series Xenon strobe manufactured by Edwards. Edwards 105 Series Xenon strobe may include heavy duty visual signals configured for use outdoors and indoors where a corrosion resistant enclosure may be required. Additionally, Edwards 105 Series Xenon strobe features may include Xenon strobe light source, 65 flash per minute (fpm) flash rate, shatter-resistant double Fresnel polycarbonate lens, and gray Rynite base with brass hardware, as will be understood by those skilled in the art. The warning indicator 208 may additionally include a light tower assembly, a strobe mount, a conduit, and a strobe mount conduit assembly, among others as will be understood by those skilled in the art.

Figure 4A:
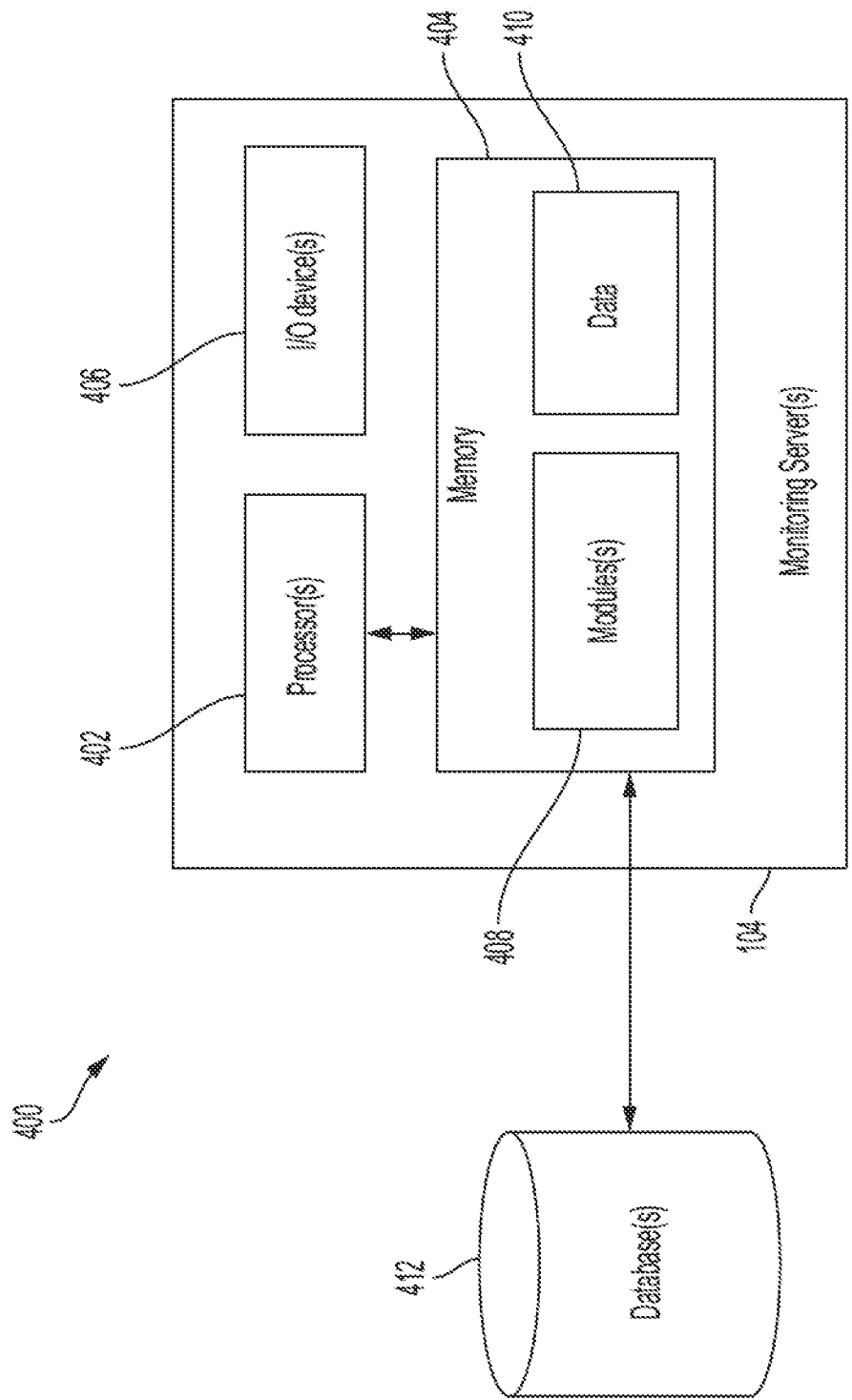
FIG. 4A is a block diagram of an exemplary remotely positioned monitoring server, according to an embodiment of the present disclosure.

FIG. 4A illustrates a block diagram as showing an example of one or more remotely positioned monitoring servers 104, as will be understood by those skilled in the art, according to an embodiment of the present disclosure. In one embodiment, the one or more remotely positioned monitoring servers 104 may include one or more processors 402, a memory 406, and one or more input/output devices 406. According to some embodiments, the one or more remotely positioned monitoring servers 104 may be standalone, or may be part of a subsystem, which may be part of a larger system. For example, the one or more remotely positioned monitoring servers 104 may represent distributed servers that are remotely located and communicate over a network (e.g., network 103) or a dedicated network, such as a LAN. The one or more remotely positioned monitoring servers 104 may be accessed by any device or machine such as a laptop computer, desktop computer, smart phone, or tablet, via a network (e.g., network 103). The one or more remotely positioned monitoring servers 104 may be positioned remote from the marine barge and in communication with the status monitoring and communication device 106.

The one or more processors 402 may include one or more known processing devices, such as a microprocessor manufactured by Intel™, AMD™, Apple™, or any of various processors as readily understood by the person skilled in the art. The one or more processors 402 may include one or more known digital signal processors (DSP). The disclosed embodiments are not limited to any type of processor(s) otherwise configured to meet the computing demands required of different components of the one or more remotely positioned monitoring servers 104.

Memory 404 may include one or more storage devices configured to store instructions executed by the one or more processors 402 to perform functions related to disclosed embodiments. For example, the memory 404 may be configured with one or more computer modules(s) 408 that may perform one or more operations when executed by the one or more processors 402.

Memory 404 may also store data 410 that reflects any type of information in any format that the one or more remotely positioned monitoring servers 104 may use to perform operations consistent with the disclosed embodiments.

I/O devices 406 may be one or more devices configured to allow data to be received and/or transmitted by the one or more remotely positioned monitoring servers 104. I/O devices 406 may include one or more digital and/or analog communication devices that allow the one or more remotely positioned monitoring servers 104 to communicate with other machines and devices.

The one or more remotely positioned monitoring servers 104 may also be communicatively connected to one or more database(s) 412, such as through network 103. The one or more database(s) 412 may include one or more memory devices that store information and are accessed and/or managed through the one or more remotely positioned monitoring servers 104. By way of example, the one or more database(s) 412 may include Oracle TM databases or other relational databases or non-relational databases, such as Hadoop sequences files as will be understood by those skilled in the art. The databases or other files may include, for example, data and information related to the source and destination of a network request, the data contained in the request, etc. The system, methods, and the kit of the disclosed embodiments, however, are not limited to separate databases. In one aspect, the one or more databases 412 may be locally connected to the one or more remotely positioned monitoring servers 104. Alternatively, the one or more database(s) 412 may be located remotely from the one or more remotely positioned monitoring servers 104. The one or more database(s) 412 may include computing components (e.g., database management system, database server, etc.) configured to receive and process requests for data stored in memory devices of the one or more database(s) 412 and to provide data from the one or more database(s) 412.

Figure 4C:

In one embodiment, for example, the one or more remotely positioned monitoring servers 104 may be configured to store the generated data signals from the one or more sensors as monitored sensor data. In one aspect, the monitored sensor data may be stored in the one or more databases 412. As illustrated in FIG. 4B, in one embodiment, for example, the monitored sensor data may be stored in pump engine parameters table 420. Pump engine parameters table 420 may include a plurality of parameters such as Equipment Serial Number (ESN), coolant temperature, oil viscosity, oil pressure, and battery volts as will be understood by those skilled in the art. In another embodiment, the monitored sensor data may be stored in location parameters table 440 as illustrated in FIG. 4C. Location parameters table 440 may include ESN, primary group, date and time, latitude, and longitude.

Figure 4D:
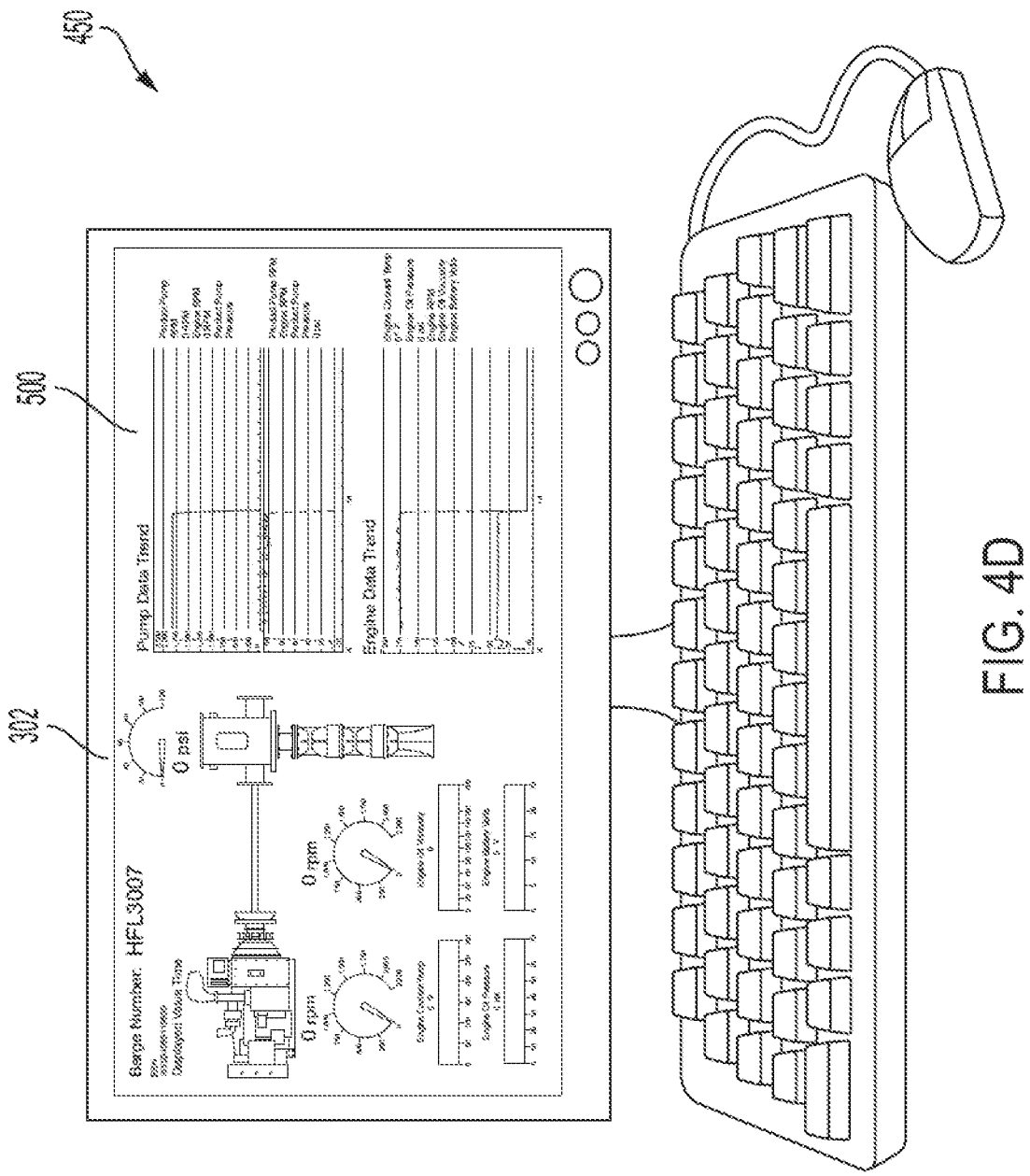
FIG. 4D is an illustration of an example of a display associated with the one or more remotely positioned monitoring servers displaying a real-time visual representation of the monitored sensor data, according to an embodiment of the present disclosure.

The one or more remotely positioned monitoring servers 104 (see FIG. 4D) may also be configured to display a real-time visual representation 500 of the monitored sensor data on a display 302 associated with the one or more remotely positioned monitoring servers 104 thereby to report the operational conditions of the pump engine and the pump and thereby define a dashboard interface to monitor the pump engine and the pump during the offloading operation of the petroleum product contents. As shown in FIG. 4D, the one or more remotely positioned monitoring servers 104 may be accessed by a device or a machine such as a desktop computer 450 having a display 302. The display 302 may include one or more known displays, such as a liquid crystal display (LCD), a light emitting diode (LED) display, an organic light emitting diode (OLED) display, among others as will be understood by those skilled in the art. In one embodiment, a graphical user interface (GUI) associated displayed on the display 302 may provide access to features of the real-time visual representation 500 of the monitored sensor data. The features may include interactive graphs configured to display historic data within a user defined time window, a zoom-in option to show details of the historic data, and a zoom-out option to show additional historic data.

Figure 5A:
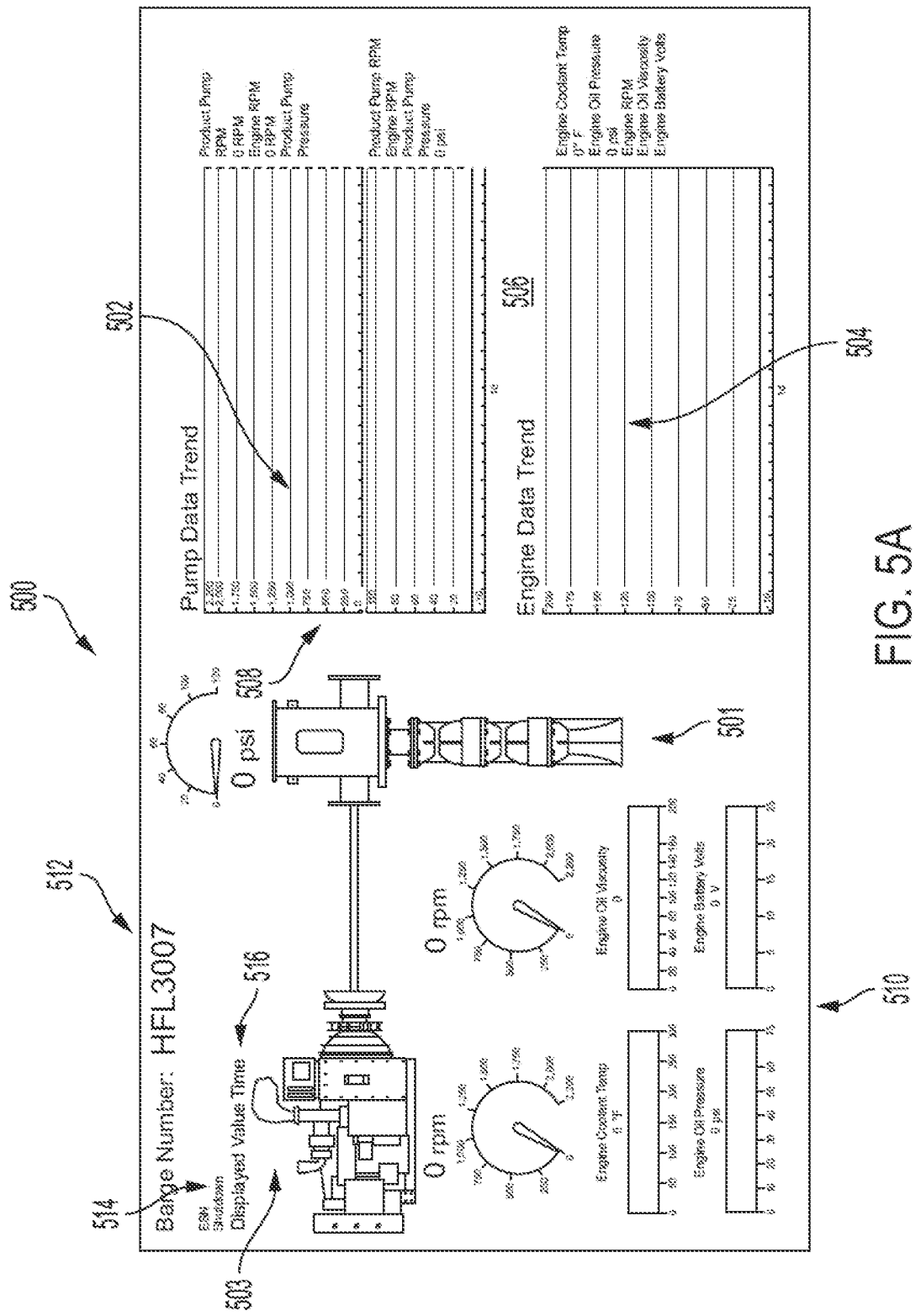
FIGS. 5A-5C are illustrations of a visual representation of sensor data, according to an embodiment of the present disclosure.
Figure 5B:
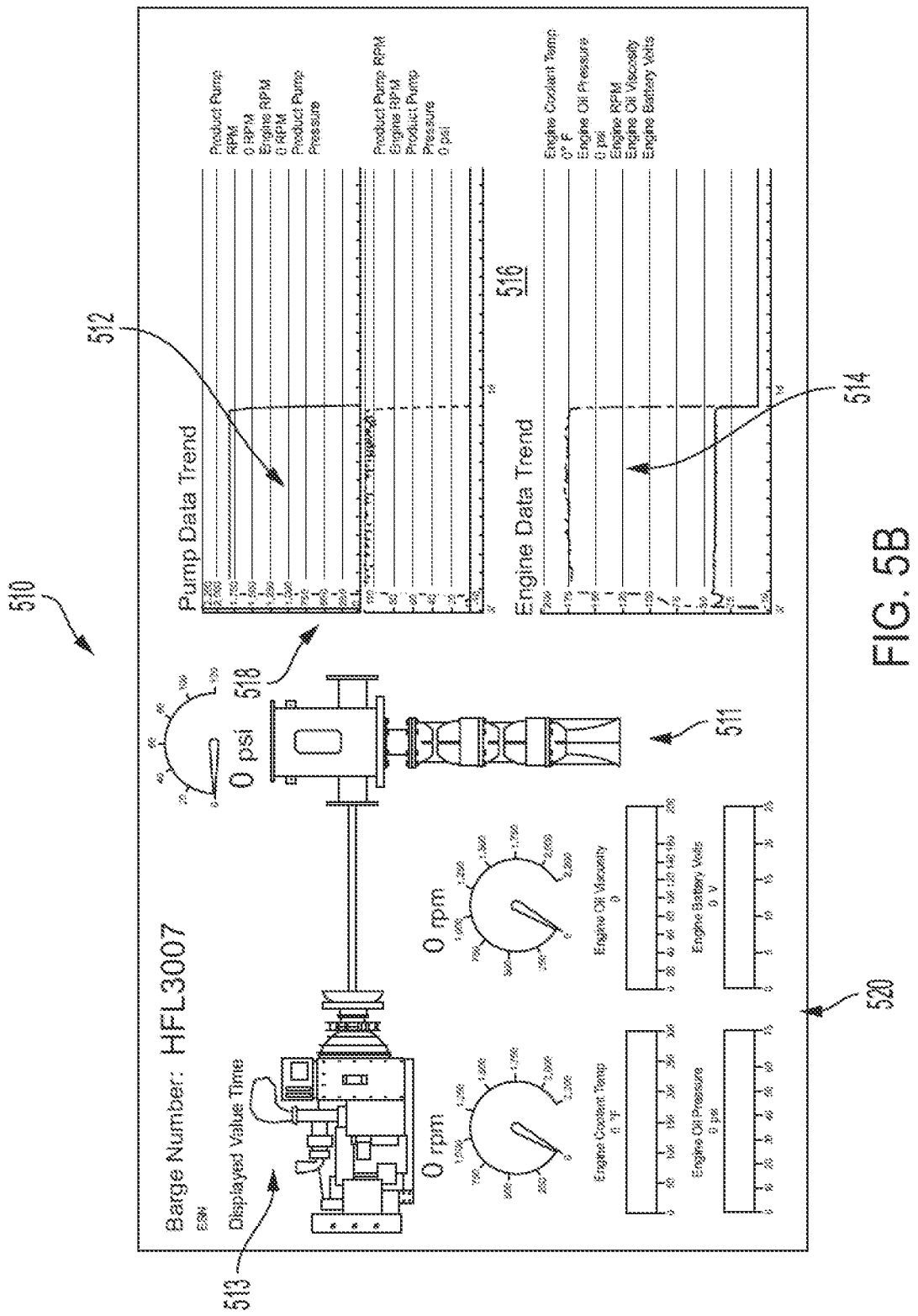
Figure 5C:
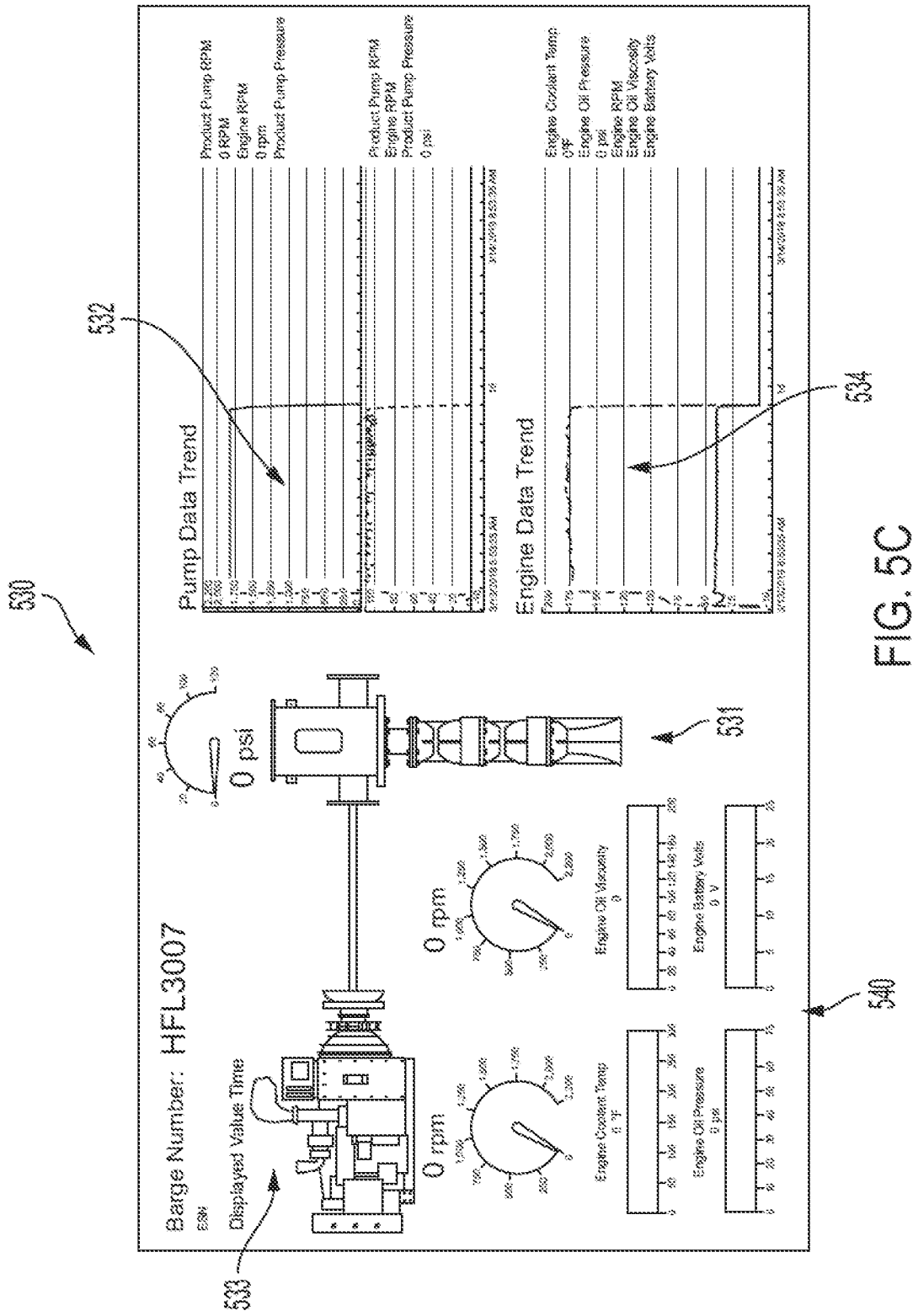

FIGS. 5A-5C illustrate real-time visual representation of the monitored sensor data associated with the marine barge according to an embodiment. In one embodiment, for example, the real-time visual representation of the generated sensor data associated with the barge may be displayed on a graphical user interface (GUI) on a display associated with the one or more remotely positioned monitoring servers 104 thereby to report the operational conditions of the pump engine 503, 513, 533 and the pump 501, 511, 531 and thereby define a dashboard interface to monitor the pump engine and the pump during the offloading operation of the petroleum product contents. In another embodiment, the real-time visual representation of the generated sensor data associated with the barge may be displayed using various clients such as tablets, smart phones, laptops, etc. The graphical user interface (GUI) (see FIG. 5A) displaying the real-time visual representation 500 may be divided into a plurality of portions. The first portion may include a plurality of graphs of data trend 502, 504 associated with the pump engine 503 and the pump 501. The plurality of graphs of data trend 502, 504 may have time along a horizontal axis 506 and a value of the monitored sensor data along a vertical axis 508. The plurality of graphs of data trend 502, 504 may represent a behavior of the physical parameters sensed by the one or more sensors 204 over time. The graphical user interface (GUI) displaying the real-time visual representation 500 may include a second portion having a plurality of digital indicators 510 of each of the physical properties associated with the pump engine 503 and engine 501 of the marine barge. The plurality of digital indicators 510 may represent monitoring parameters such as engine coolant temperature, engine oil viscosity, engine oil pressure, and engine battery volts. The graphical user interface (GUI) 510 may also display ESN 512 which uniquely identifies each marine barge. In one aspect, the graphical user interface (GUI) 510 may also display a status of the operation of the marine barge 514 and the date and time stamp 516 when the monitored sensor data were retrieved.

FIG. 5B illustrates an example of the visual representation 510 which may include various graphs of data trend 512, 514 and a plurality of digital indicators 520 when the marine barge is offloading. The plurality of graphs of data trend 512, 514 may have time along a horizontal axis 516 and a value of the monitored sensor data along a vertical axis 518. The plurality of digital indicators 510 may represent monitoring parameters such as engine coolant temperature, engine oil viscosity, engine oil pressure, and engine battery volts. FIG. 5C shows an embodiment of the visual representation 530 of the monitored sensor data associated with the pump engine 533 and the pump 531 illustrating a zoomed-in region of each of the graphs of data trend 532, 534. The plurality of digital indicators 540 may represent monitoring parameters such as engine coolant temperature, engine oil viscosity, engine oil pressure, and engine battery volts.

According to one aspect of the present disclosure, the one or more determinations, by the input/output module 310 in communication with the warning indicator 208, that the one or more preselected thresholds have been met, may include receiving a pump engine rotational speed signal associated with a rotating component of the pump engine from the one or more sensors 204. The received pump engine rotational speed signal may correspond to a value of a pump engine rotational speed. The one or more determinations, by the input/output module 310 in communication with the warning indicator 208, that the one or more preselected thresholds have been met, may include comparing the value of the pump engine rotational speed to the preselected thresholds, may also include determining whether the value of the pump engine rotational speed exceeds the one or more preselected thresholds, and generating a local alarm signal to activate the warning indicator, thereby alerting the barge offloading operation personnel when the pump engine rotational speed exceeds the one or more preselected thresholds when offloading the petroleum product contents. For example, the warning indicator 208 may be activated in response to detecting a pump engine rotational speed exceeding 1900 revolutions per minute (RPM).

In another embodiment, the one or more determinations, by the input/output module 310 in communication with the warning indicator 208, that the one or more preselected thresholds have been met, may include receiving a pump pressure signal associated with the pump from the one or more sensors 204, the received pump pressure signal being corresponding to a value of a pump pressure, the pump being positioned to transfer the petroleum product contents from the marine barge to one or more product storages, comparing the value of the pump pressure to the one or more preselected thresholds, determining whether the value of the pump pressure associated with the pump is less than the one or more preselected thresholds, and generating a local alarm signal to activate the warning indicator, thereby alerting the barge offloading operation personnel when the pump pressure drops below the one or more preselected thresholds when offloading the petroleum product contents.

Figure 6:
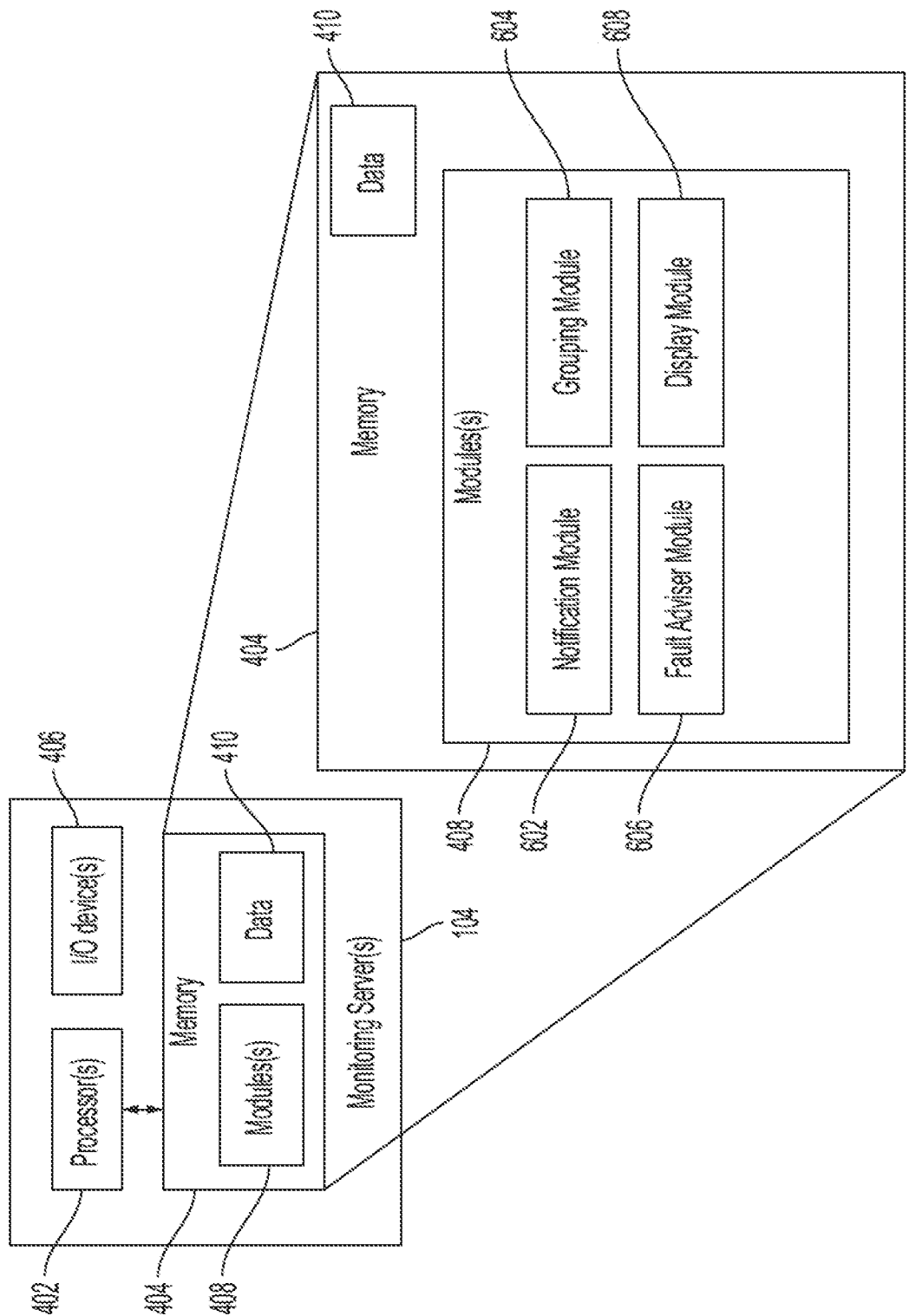
FIG. 6 is a block diagram illustrating modules associated with the remotely positioned monitoring server, according to an embodiment of the present disclosure.

As illustrated in FIG. 6, the plurality of modules 408 may include notification module 602, grouping module 604, fault adviser module 606, and display module 608. It should be understood, however, that the disclosed embodiments are not limited to the modules 408 disclosed herein, and may include other modules. The plurality of modules 408 may be implemented in software, hardware, or a combination thereof. For example, the plurality of modules 408 may be stored in memory 404, and executed by one or more processors 402 associated with the one or more remotely positioned monitoring servers 104.

In one embodiment, for example, notification module 602 may be configured to transmit a notification message to one or more remotely positioned predetermined devices responsive to the improper operational condition. The notification message may include one or more descriptions describing a symptom associated with the improper operational condition of the pump engine and the pump, thereby notifying the barge offloading operation personnel the warning indicator has been activated and prompting for a condition-based corrective maintenance.

In another embodiment, a grouping module 604 may be configured to segment the monitored sensor data into one or more groupings based on the physical properties associated with the pump engine and engine of the marine barge; and transmit the one or more segmented groupings to one or more groups of maintenance personnel responsible for maintaining a life-cycle management of the pump engine and the engine based on the physical properties associated with the pump engine and the engine of the marine barge.

In yet another disclosed embodiment, a fault adviser module 606 may be configured to retrieve a selected predefined rule based on historical data associated with the operational conditions of the pump engine and the pump from a rule database 792; compare a selected data retrieved from the monitored sensor data to the retrieved selected predefined rule to predict a failure associated with the pump engine and the pump; and generate a diagnosis report to initiate an intervention for maintenance associated with the predicted failure associated with the pump engine and the pump, thereby reducing downtime associated with an unplanned intervention for repair.

Display module 608 may be configured to obtain monitored sensor data and generates graphical user interface (GUI) displaying the real-time visual representation 500. The GUI displaying the real-time visual representation 500 may be divided into a plurality of portions.

The present disclosure also is directed to a marine barge monitoring method to monitor remotely operational conditions of a pump engine and a pump mounted on a marine barge during offloading operation of barge petroleum product contents. For purposes of illustration, an embodiment of a method depicted in FIG. 7A may be implemented using the embodiments of the marine barge monitoring system 106. In some embodiments, for example, the method may begin at step 702 by receiving, by a status monitoring and communication device 106 having one or more processors 320 and a device memory 322 and being connected to a power source of the marine barge, data signals indicative of the operational conditions of the pump engine and the pump from one or more sensors 204. The status monitoring and communication device 106 may be configured to receive the data signals from the one or more sensors 204 every five minutes when a hard line power may be present. In one embodiment, the status monitoring and communication device 106 may be configured to periodically transmit the data signals to the one or more remotely positioned servers 104, for example.

According to an embodiment of the present disclosure, the status monitoring and communication device 106 may be communicatively connected to an input/output module 310 via a relay control module 308 of an electronic assembly 302 positioned in a housing 202. The status monitoring and communication device 106 may be positioned to transmit the received data signals therefrom. The housing 202 may be connected to the marine barge in a position to monitor the pump engine and pump. The one or more sensors 204 may be positioned to sense physical properties associated with the pump engine and the pump. A warning indicator 208 may be connected to the electronic assembly 302 and responsive to one or more determinations that one or more preselected thresholds, associated with the operational conditions of the pump engine and the pump and being sensed by the one or more sensors 204, have been met thereby indicating an improper operational condition. The warning indicator 208 may further be positioned to provide a visual warning to barge offloading operation personnel when offloading the petroleum product contents. The method may continue with step 704 by storing the received data signals as monitored sensor data in the device memory 322 of the status monitoring and communication device 106.

Figure 7A:
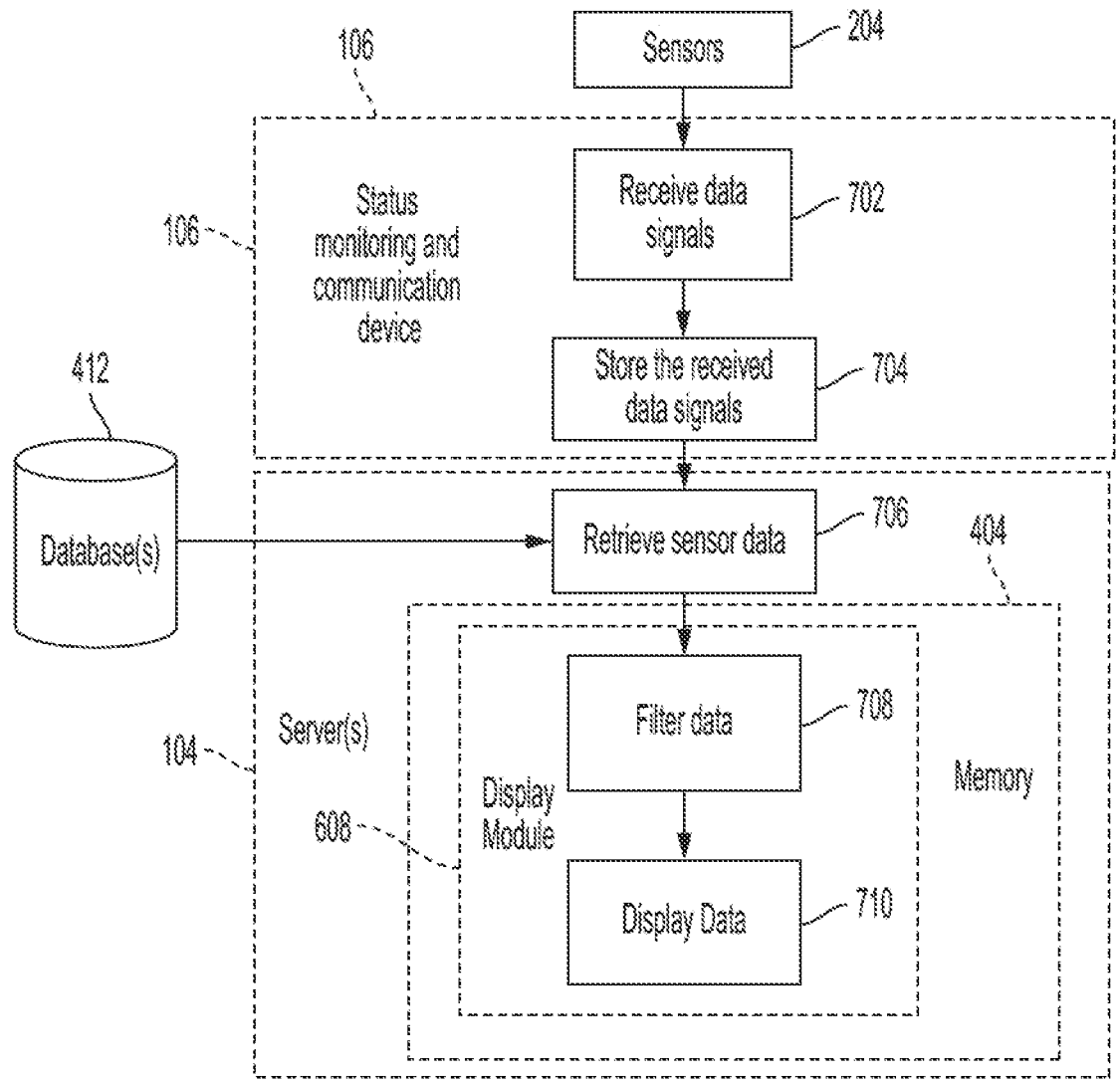
FIG. 7A is a flow diagram illustrating an example of a process for displaying a visual representation of monitored sensor data, according to an embodiment of the present disclosure.

In some embodiments, for example, the method depicted in FIG. 7A may proceed with step 706, for example, with retrieving 706, by one or more remotely positioned monitoring servers 104 positioned remote from the marine barge, the monitored sensor data from the device memory 322 of the status monitoring and communication device 106 positioned remote from the marine barge. In one or more embodiments, the method may further involve step 708 by filtering the retrieved monitored sensor data according to one or more user-selectable filter criteria.

In some embodiments, for example, the method shown in FIG. 7A may further proceed at step 710 with displaying, by the one or more remotely positioned monitoring servers 104, a real-time visual representation of the filtered retrieved monitored sensor data on a display associated with the one or more remotely positioned monitoring servers 104 thereby to report the operational conditions of the pump engine and the pump and thereby to define a personnel dashboard interface to monitor the pump engine and the pump during the offloading operation of the petroleum product contents.

Figure 7B:
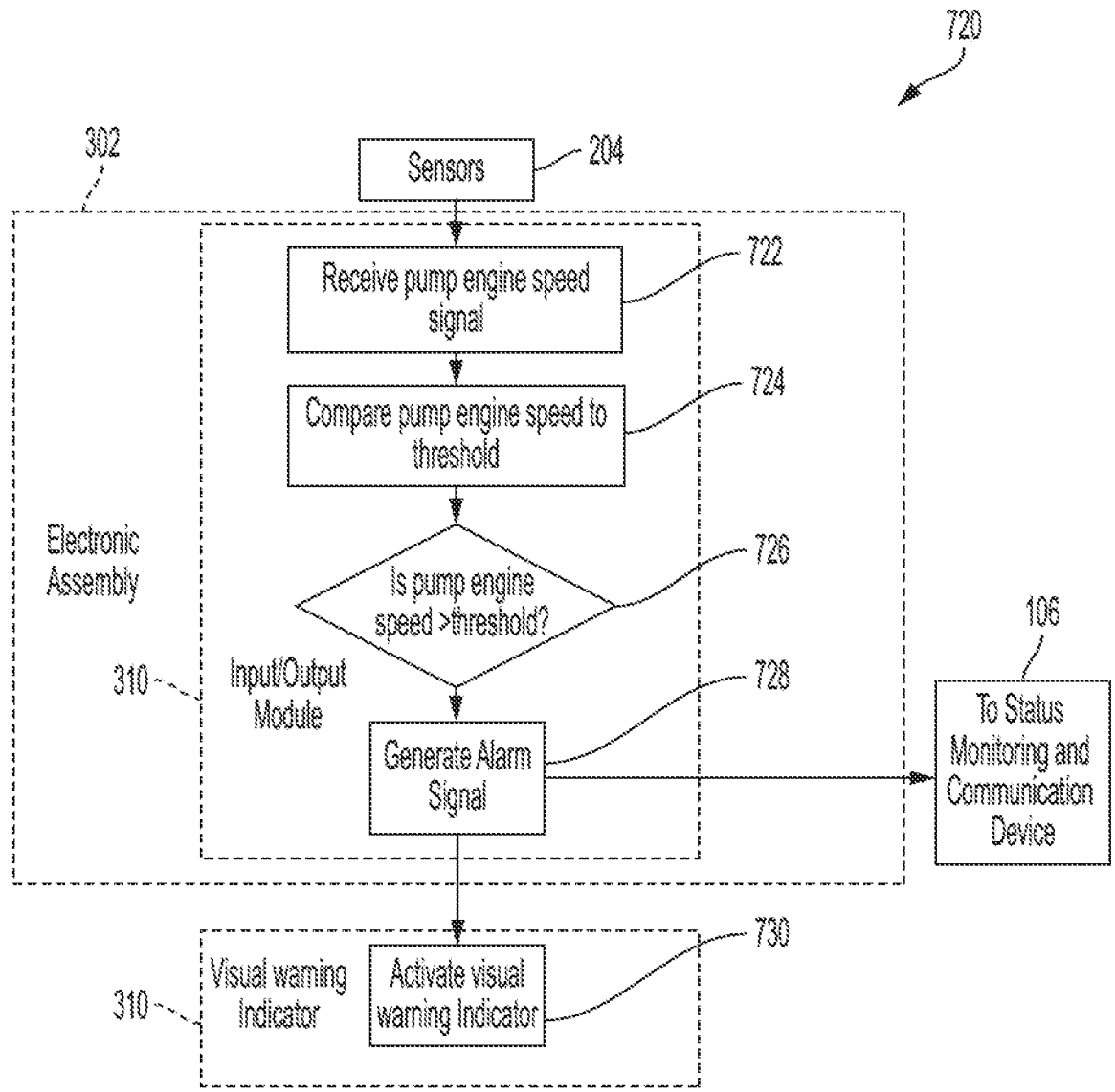
FIGS. 7B-7C are flow diagrams illustrating an example of a process for determining preselected thresholds that have been met, according to an embodiment of the present disclosure.

As illustrated in FIG. 7B, in one embodiment, the one or more determinations 720, by the input/output module 310 in communication with the warning indicator 208, that the one or more preselected thresholds have been met, may begin at step 722 by receiving, by the input/output module 310, a pump engine rotational speed signal associated with a rotating component of the pump engine from the one or more sensors 204. The received pump engine rotational speed signal may correspond to a value of a pump engine rotational speed. The one or more determinations 720 may continue with step 724 by comparing the value of the pump engine rotational speed to the preselected thresholds. Additionally, the one or more determinations 720 may further continue with step 726 by determining whether the value of the pump engine rotational speed exceeds the one or more preselected thresholds. The one or more determinations 720 may further involve step 728 by generating a local alarm signal to activate 730 the warning indicator 208, thereby alerting the barge offloading operation personnel when the pump engine rotational speed exceeds the one or more preselected thresholds when offloading the petroleum product contents.

Figure 7C:
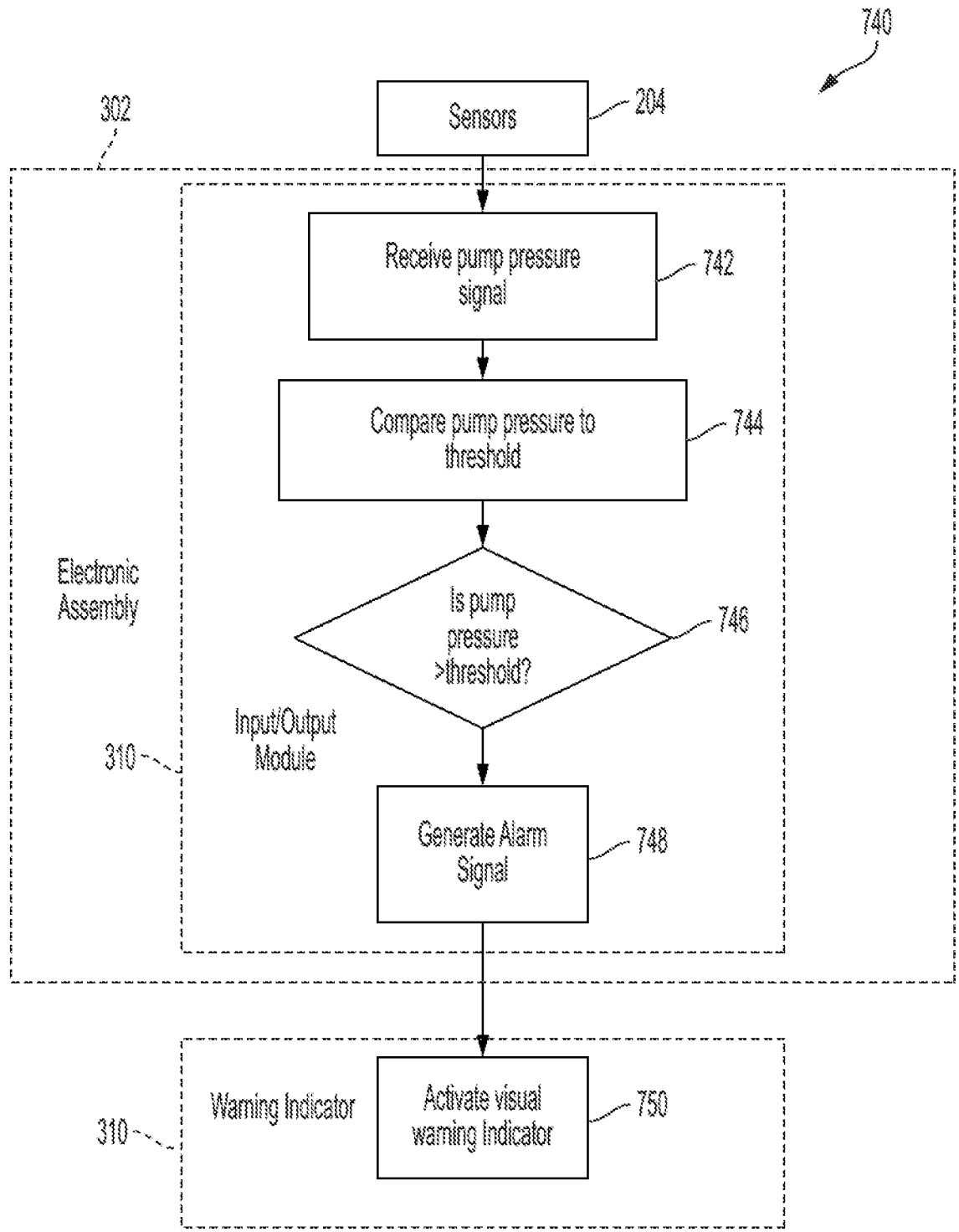

In the embodiment illustrated in FIG. 7C, for example, the one or more determinations 740, by the input/output module 310 in communication with the warning indicator 208, that the one or more preselected thresholds have been met, may begin with step 742 by receiving a pump pressure signal associated with the pump from the one or more sensors 204. The received pump pressure signal may correspond to a value of a pump pressure. The pump may be positioned to transfer the petroleum product contents from the marine barge to one or more product storages. The one or more determinations 740 may continue with step 744 by comparing the value of the pump pressure to the one or more preselected thresholds. Additionally, the one or more determinations 740 may further continue with step 746 by determining 746 whether the value of the pump pressure associated with the pump is less than the one or more preselected thresholds. Thereafter, the one or more determinations 740 may proceed at step 748 with generating a local alarm signal to activate 750 the warning indicator 208, thereby alerting the barge offloading operation personnel when the pump pressure drops below the one or more preselected thresholds when offloading the petroleum product contents.

Figure 7D:
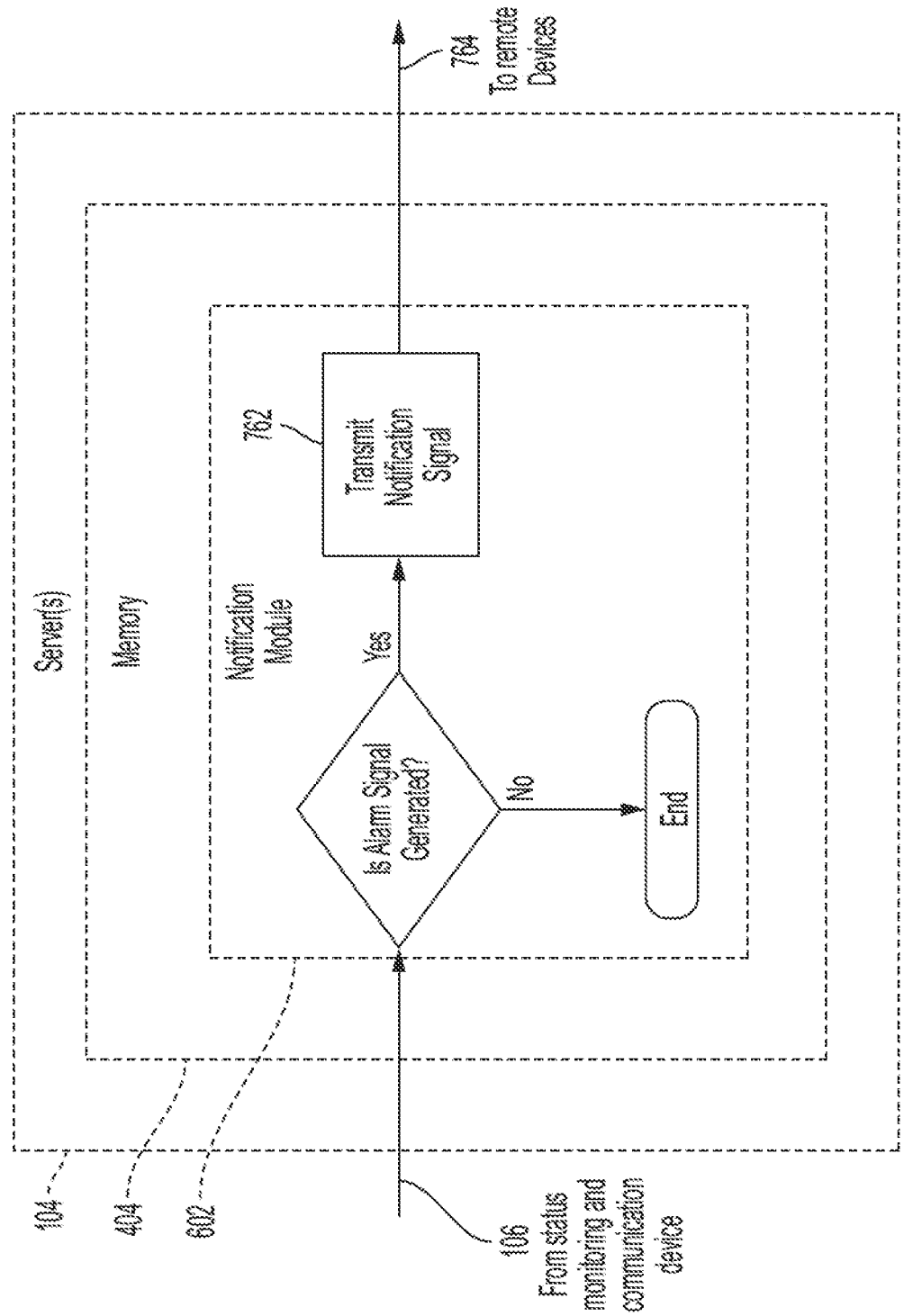
FIG. 7D is a flow diagram illustrating an example of a process for transmitting notification signal, according to an embodiment of the present disclosure.

In some embodiments, a notification module 602 depicted in FIG. 7D may be configured to transmit a notification message to one or more remotely positioned predetermined devices 764 at step 762 responsive to the improper operational condition. In one embodiment, the improper operational condition may be indicated when the alarm signal was generated. The notification message may include one or more descriptions describing a symptom associated with the improper operational condition of the pump engine and the pump, thereby notifying the barge offloading operation personnel the warning indicator has been activated and prompting for a condition-based corrective maintenance.

In one embodiment as illustrated in FIG. 7E, a grouping module 604 associated with the one or more remotely positioned servers 104 may be configured to retrieve the monitored sensor data from the one or more databases 412 at step 770. The grouping module 604 may be further configured to segment the monitored sensor data into one or more groupings based on the physical properties associated with the pump engine and engine of the marine barge at step 772. Then, the grouping module 604 may be configured to store the one or more groupings at step 774. Subsequently, the grouping module 604 may be configured to transmit the one or more segmented groupings to one or more groups of maintenance personnel responsible for maintaining a lifecycle management of the pump engine and the engine based on the physical properties associated with the pump engine and the engine of the marine barge at step 776.

Figure 7F:
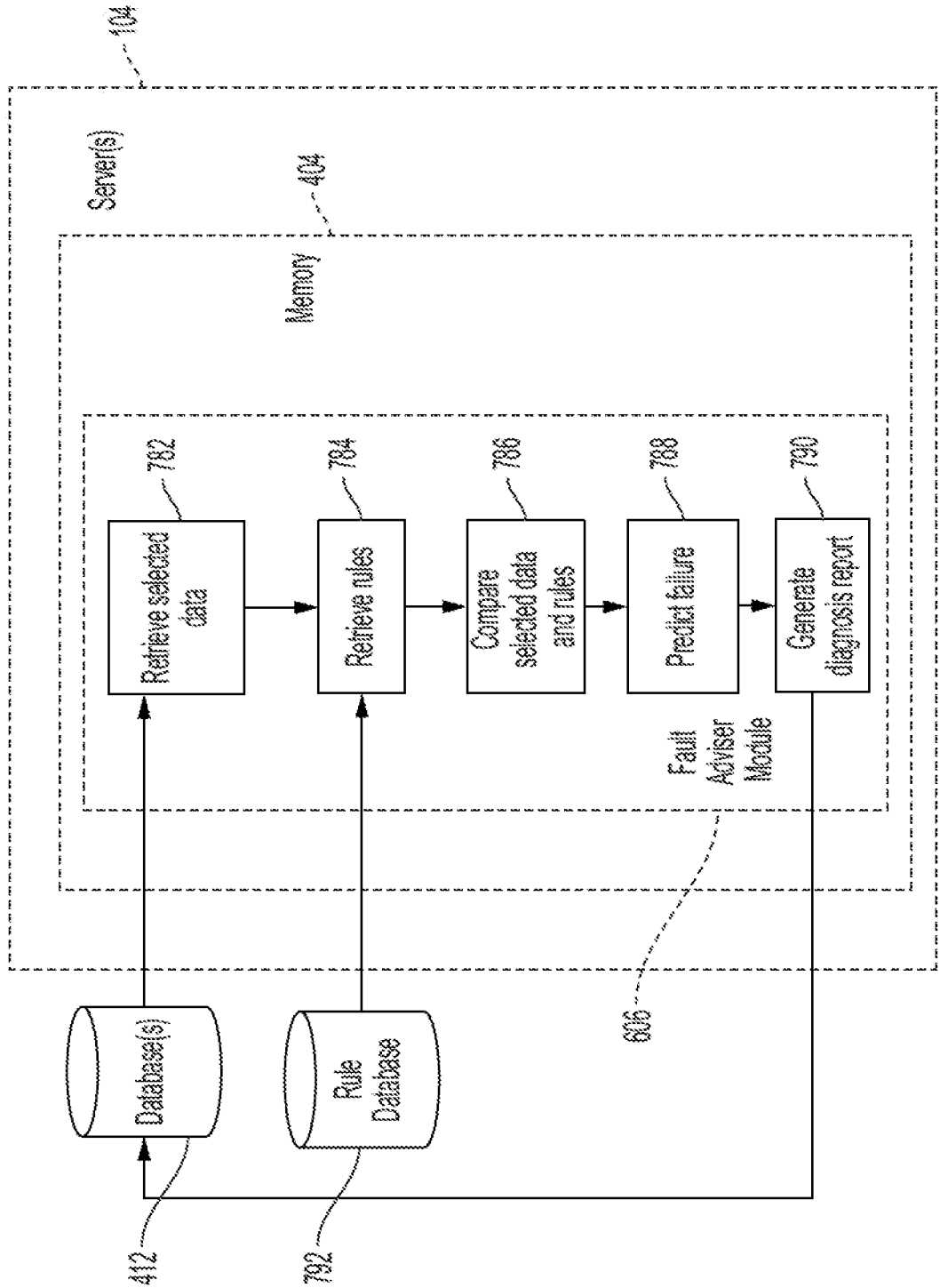
FIG. 7F is a flow diagram illustrating an example of a process for predicting failure, according to an embodiment of the present disclosure.

In another embodiment as illustrated in FIG. 7F, a fault adviser module 606 associated with the one or more remotely positioned servers 104 may be configured to retrieve selected data from the one or more databases 412 at step 782. After step 782, the fault adviser module 606 may be configured to retrieve predefined rule based on historical data associated with the operational conditions of the pump engine and the pump from a rule database 792 at step 784. The fault adviser module 606 may be further configured to compare a selected data retrieved from the monitored sensor data to the retrieved selected predefined rule at step 786 to predict 788 a failure associated with the pump engine and the pump. Subsequently, the fault adviser module 606 may generate a diagnosis report to initiate an intervention for maintenance associated with the predicted failure associated with the pump engine and the pump at step 790, thereby reducing downtime associated with an unplanned intervention for repair.

The present disclosure is also directed to a kit 800 to monitor remotely operational conditions of a pump engine and a pump mounted on a marine barge during offloading operation of barge petroleum product contents. In some embodiments as illustrated in FIG. 8, for example, the kit 800 may include a container 802, a housing 202 positioned in the container 802, a status monitoring and communication device 206 positioned in the container 802, and a warning indicator 208 positioned in the container 802. The housing 202 may be configured to be connected to the marine barge, and configured to monitor the pump engine and the pump and having an electronic assembly 302 positioned in the housing 202, the electronic assembly 302 having a relay control module 308 and an input/output module 310. In one embodiment, the status monitoring and communication device 206 may be configured to be communicatively connected to the relay control module 308, the status monitoring and communication device 206 having one or more processors 320. The status monitoring and communication device 206 also may be configured to be connected to a power source of the marine barge, positioned to receive generated data signals from one or more sensors 204, and configured to transmit the generated data signals therefrom. In some embodiments, a warning indicator 208 may be configured to be connected to the electronic assembly 302 and responsive to one or more determinations that one or more preselected thresholds, associated with the operational conditions of the pump engine and the pump and being sensed by the one or more sensors 204, have been met thereby indicating an improper operational condition. The warning indicator 208 may further be positioned to be configured to provide a visual warning to barge offloading operation personnel when offloading the petroleum product contents.

The present disclosure is also directed to a fleet monitoring system to monitor remotely operational conditions of a pump engine and a pump mounted on each of a plurality of marine barges 101A, 101B, 101C defining a fleet during offloading operation of barge petroleum product contents. In one embodiment, for example, a housing 202 may be connected to each of the plurality of marine barges 101A, 101B, 101C in the fleet in a position to monitor the pump engine and the pump. As shown in FIG. 3A, the housing 202 may include an electronic assembly 302 positioned in the housing 202. The housing 202 may be a ruggedized enclosure and include a protective cover 304 and a lock 306. In one embodiment, for example, the electronic assembly 302 may include a relay control module 308 and an input/output module 310 as illustrated in FIG. 3B.

In one embodiment, the one or more sensors 204 may be communicatively connected to the relay control module 308 via the input/output module 310. The one or more sensors 204 may be positioned to sense physical properties associated with the pump engine and the pump and generate data signals indicative of the operational conditions of the pump engine and the pump.

FIG. 3C, for example, illustrates a status monitoring and communication device 106 may be communicatively connected to the relay control module 308. In one embodiment, the status monitoring and communication device 106 may include one or more processors 320, a device memory 322, I/O module 324, a transceiver 326, a GPS 328, and an antenna 330. The status monitoring and communication device 106 may be connected to a power source of each of the plurality of marine barges 101A, 101B, 101C in the fleet and may be positioned to receive the generated data signals from the one or more sensors 204. The status monitoring and communication device 106 may be positioned to transmit the generated data signals therefrom.

A warning indicator 208 (see FIG. 2), for example, may be connected to the electronic assembly 302 and may be responsive to one or more determinations that one or more preselected thresholds, associated with operational conditions of the pump engine and the pump and being sensed by the one or more sensors 204, have been met thereby indicating an improper operational condition. The warning indicator 208 further may be positioned to provide a visual warning to barge offloading operation personnel when offloading the petroleum product contents.

In one embodiment, for example, the one or more remotely positioned monitoring servers 104 may include a memory 404. The one or more remotely positioned monitoring servers 104 may be positioned remote from each of the plurality of marine barges 101A, 101B, 101C in the fleet and in communication with the status monitoring and communication device. The one or more remotely positioned monitoring servers 104 may be configured to store the generated data signals from the one or more sensors as monitored sensor data. In one aspect, the monitored sensor data may be stored in the one or more databases 412.

The one or more remotely positioned monitoring servers 104 (see FIG. 4D) may also be configured to display a real-time visual representation 500 of the monitored sensor data on a display 302 associated with the one or more remotely positioned monitoring servers 104 thereby to report the operational conditions of the pump engine and the pump and thereby define a dashboard interface to monitor the pump engine and the pump during the offloading operation of petroleum product contents.

According to one embodiment of the present disclosure, for example, the one or more determinations, by the input/output module 310 in communication with the warning indicator 208, that the one or more preselected thresholds have been met, may include receiving a pump engine rotational speed signal associated with a rotating component of the pump engine from the one or more sensors 204. The received pump engine rotational speed signal may correspond to a value of a pump engine rotational speed. The one or more determinations, by the input/output module 310 in communication with the warning indicator 208, that the one or more preselected thresholds have been met, may include comparing the value of the pump engine rotational speed to the preselected thresholds, may also include determining whether the value of the pump engine rotational speed exceeds the one or more preselected thresholds, and generating a local alarm signal to activate the warning indicator, thereby alerting the barge offloading operation personnel when the pump engine rotational speed exceeds the one or more preselected thresholds when offloading the petroleum product contents.

In another embodiment, the one or more determinations, by the input/output module 310 in communication with the warning indicator 208, that the one or more preselected thresholds have been met, may include receiving a pump pressure signal associated with the pump from the one or more sensors 204, the received pump pressure signal being corresponding to a value of a pump pressure, the pump being positioned to transfer the petroleum product contents from each of the plurality of marine barges 101A, 101B, 101C in the fleet to one or more product storages, comparing the value of the pump pressure to the one or more preselected thresholds, determining whether the value of the pump pressure associated with the pump is less than the one or more preselected thresholds, and generating a local alarm signal to activate the warning indicator, thereby alerting the barge offloading operation personnel when the pump pressure drops below the one or more preselected thresholds when offloading the petroleum product contents.

In one embodiment, for example, the memory 404 of the one or more remotely positioned monitoring servers 104 may include a notification module. The notification module 602 may be configured to transmit a notification message to one or more remotely positioned predetermined devices responsive to the improper operational condition. The notification message may include one or more descriptions describing a symptom associated with the improper operational condition of the pump engine and the pump, thereby notifying the barge offloading operation personnel the warning indicator has been activated and prompting for a condition-based corrective maintenance.

In one embodiment, for example, a transceiver 326 may be in communication with the one or more processors 320 associated with the status monitoring and communication device 106. The transceiver 326 associated with the status monitoring and communication device 106 may be configured to transmit the generated data signals as one or more communication messages in a short burst data format to a remotely positioned gateway 105 via a satellite network.

In another embodiment, the memory 404 of the one or more remotely positioned monitoring servers 104 may further include a grouping module 604. The grouping module 604 may be configured to segment the monitored sensor data into one or more groupings based on the physical properties associated with the pump engine and engine of each of the plurality of marine barges 101A, 101B, 101C in the fleet; and transmit the one or more segmented groupings to one or more groups of maintenance personnel responsible for maintaining a life-cycle management of the pump engine and the engine based on the physical properties associated with the pump engine and the engine of each of the plurality of marine barges in the fleet.

In yet another disclosed embodiment, a fault adviser module 606 may be configured to retrieve a selected predefined rule based on historical data associated with the operational conditions of the pump engine and the pump from a rule database 792; compare a selected data retrieved from the monitored sensor data to the retrieved selected predefined rule to predict a failure associated with the pump engine and the pump; and generate a diagnosis report to initiate an intervention for maintenance associated with the predicted failure associated with the pump engine and the pump, thereby reducing downtime associated with an unplanned intervention for repair.

In one embodiment, for example, the status monitoring and communication device 206 may be configured to be connected to and in communication with the input/output module 310 via the relay control module 308 positioned in the housing 202. The housing 202 may be adapted to be positioned adjacent a location of the pump engine and the pump on each of the plurality of marine barges 101A, 101B, 101C. The input/output module 310 may include one or more input channels and one or more output channels. The one or more input channels may be configured to be connected to the one or more sensors 204, and the one or more output channels may be configured to be connected to the relay control module 308 and the warning indicator 208.

Note that some or all of the components as shown and described above may be implemented in software, hardware, or a combination thereof. For example, such components may be implemented as software installed and stored in a storage device, which may be loaded and executed in a memory by a processor to carry out the processes or operations described throughout this application as will be understood by those skilled in the art. Furthermore, such components may be implemented as specific hardware logic in a processor or processor core as part of an instruction set accessible by a software component via one or more specific instructions.

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, computer-readable media, or existing communications software.

This is a continuation of U.S. Non-Provisional application Ser. No. 16/988,849, filed Aug. 10, 2020, titled "BARGE OFFLOADING MONITORING SYSTEMS, METHODS, AND KIT," which claims priority to and the benefit of U.S. Provisional Application No. 63/012,045, filed Apr. 17, 2020, titled "BARGE OFFLOADING MONITORING SYSTEMS, METHODS, AND KIT," and U.S. Provisional Application No. 63/011,643, filed Apr. 17, 2020, titled "BARGE OFFLOADING MONITORING SYSTEMS, METHODS, AND KIT," the entire disclosures of which are incorporated herein by reference.

It should be understood that the order of activity as depicted in the figures above are conceptual and may deviate without departing from the various embodiments disclosed. Moreover, the specification and drawings are, accordingly, to be regarded in an illustrative rather than a restrictive sense. It will, however, be evident that various modifications and changes may be made thereunto without departing from the broader spirit and scope of the disclosure. While different embodiments of the disclosure, including apparatuses, systems, and methods, have been shown or described in only some of its forms, it should be apparent to those skilled in the art that the disclosure is not so limited, but is susceptible to various changes without departing from the scope of the disclosure. Furthermore, it is to be understood that the above disclosed embodiments are merely illustrative of the principles and applications of the present disclosure. Accordingly, numerous modifications may be made to the illustrative embodiments and other arrangements may be devised without departing from the spirit and scope of the present disclosure.

The invention claimed is:

1. A marine barge monitoring system to monitor remotely operational conditions of a pump engine and a pump mounted on a marine barge during offloading operation, the system comprising:

a housing connected to the marine barge in a position to monitor the pump engine and the pump;

an electronic assembly positioned in the housing and having a relay control module and an input/output module;

one or more sensors communicatively connected to the relay control module, thereby to sense physical properties associated with the pump engine and the pump and generate data signals indicative of the operational conditions of the pump engine and the pump;

a status monitoring and communication device communicatively connected to the relay control module, the status monitoring and communication device having one or more processors, positioned to receive the generated data signals from the one or more sensors, and positioned to transmit the generated data signals therefrom;

a warning indicator connected to the electronic assembly and responsive to one or more determinations that one or more thresholds have been met, thereby to indicate an improper operational condition of one or more of: the pump or the pump engine; and one or more remotely positioned monitoring servers having a memory positioned remote from the marine barge and in communication with the status monitoring and communication device, the one or more remotely positioned monitoring servers being configured to:

store the generated data signals from the one or more sensors as monitored sensor data, and display a representation of the monitored sensor data on a display associated with the one or more remotely positioned monitoring servers, thereby to report the operational conditions of the pump engine and the pump.

2. The system as defined in claim 1, wherein the one or more determinations, by the input/output module in communication with the warning indicator, that the one or more preselected thresholds have been met, includes:

receiving a pump engine rotational speed signal associated with a rotating component of the pump engine from the one or more sensors, the received pump engine rotational speed signal corresponding to a value of a pump engine rotational speed, comparing the value of the pump engine rotational speed to the one or more thresholds, determining whether the value of the pump engine rotational speed exceeds the one or more thresholds, and generating an alarm signal to activate the warning indicator, thereby to alert the barge offloading operation personnel when the pump engine rotational speed exceeds the one or more thresholds when offloading contents.

3. The system as defined in claim 1, wherein the one or more determinations, by the input/output module in communication with the warning indicator, that the one or more preselected thresholds have been met, includes:

receiving a pump pressure signal associated with the pump from the one or more sensors, the received pump pressure signal corresponding to a value of a pump pressure, the pump positioned to transfer contents from the marine barge to one or more storages, comparing the value of the pump pressure to the one or more thresholds, determining whether the value of the pump pressure associated with the pump is less than the one or more thresholds, and generating an alarm signal to activate the warning indicator, thereby to alert the barge offloading operation personnel when the pump pressure drops below the one or more preselected thresholds when offloading contents.

4. The system as defined in claim 1, wherein the memory of the one or more remotely positioned monitoring servers includes a notification module configured to transmit a notification message to one or more remotely positioned predetermined devices responsive to the improper operational condition, the notification message including one or more descriptions associated with a symptom indicative of the improper operational condition of one or more of the pump engine or the pump, thereby to notify the barge offloading operation personnel the warning indicator has been activated.

5. The system as defined in claim 1, wherein the status monitoring and communication device includes a transceiver in communication with the one or more processors associated with the status monitoring and communication device, the transceiver associated with the status monitoring and communication device configured to transmit the generated data signals as one or more communication messages in a short burst data format to a remotely positioned gateway via a satellite network.

6. The system as defined in claim 1, wherein the memory of the one or more remotely positioned monitoring servers further includes a grouping module configured to:

segment the monitored sensor data into one or more groupings based on the physical properties associated with the pump engine and engine of the marine barge, and transmit the one or more segmented groupings as an indication, thereby to maintain a life-cycle management of the pump engine and the engine based on the physical properties associated with the pump engine and the engine of the marine barge.

7. The system as defined in claim 1, wherein the memory of the one or more remotely positioned monitoring servers further includes a fault adviser module configured to:

retrieve a pre-selected predefined rule from a rule database, the predefined rule based on historical data associated with the operational conditions of the pump engine and the pump, compare selected data retrieved from the monitored sensor data to the retrieved selected predefined rule, thereby to predict a failure associated with the pump engine and the pump, and generate a diagnosis report to initiate an intervention for maintenance associated with the predicted failure associated with the pump engine and the pump, thereby to reduce downtime associated with an unplanned intervention for repair.

8. The system as defined in claim 1, wherein the status monitoring and communication device is connected to and in communication with the input/output module via the relay control module positioned in the housing, the housing positioned adjacent a location of the pump engine and the pump on the marine barge, the input/output module having one or more input channels and one or more output channels, the one or more input channels connected to the one or more sensors, and the one or more output channels connected to the relay control module and the warning indicator.

9. A marine barge monitoring method to monitor remotely operational conditions of a pump and a pump engine mounted on a marine barge during offloading operation of barge contents, the method comprising:

sensing, via one or more sensors, data associated with the physical properties of the pump engine and the pump during operation, thereby to generate data signals associated with the operational conditions of the pump and pump engine;

receiving, by a status monitoring and communication device having one or more processors and a device memory, the data signals indicative of the operational conditions of the pump and the pump engine, the status monitoring and communication device communicatively connected to an input/output module via a relay control module of an electronic assembly;

transmitting the received data signals from the status monitoring and communications device to one or more remote servers, thereby to monitor status of the pump and pump engine of the marine barge;

indicating, via a warning indicator connected to the electronic assembly and responsive to one or more determinations, that one or more selected thresholds have been met, the one or more selected thresholds associated with the operational conditions of the pump and the pump engine and sensed by the one or more sensors, thereby to indicate an improper operational condition;

filtering the retrieved monitored sensor data according to one or more user-selectable filter criteria; and displaying, by the one or more remotely positioned monitoring servers, a representation of the filtered retrieved monitored sensor data on a display associated with the one or more remotely positioned monitoring servers, thereby to report the operational conditions of the pump and the pump engine during the offloading operation of contents.

10. The method as defined in claim 9, wherein the one or more determinations, by the input/output module in communication with the warning indicator, that the one or more selected thresholds have been met, includes:

receiving, by the input/output module, a pump engine rotational speed signal associated with a rotating component of the pump engine from the one or more sensors, the received pump engine rotational speed signal corresponding to a value of a pump engine rotational speed, comparing the value of the pump engine rotational speed to the one or more selected thresholds, determining whether the value of the pump engine rotational speed exceeds the one or more selected thresholds, and generating an alarm signal to activate the warning indicator, thereby to provide an alert when the pump engine rotational speed exceeds the one or more selected thresholds when offloading the contents.

11. The method as defined in claim 9, wherein the one or more determinations, by the input/output module in communication with the warning indicator, that the one or more selected thresholds have been met, include:

receiving a pump pressure signal associated with the pump from the one or more sensors, the received pump pressure signal corresponding to a value of a pump pressure, the pump positioned to transfer the contents from the marine barge to one or more storages, comparing the value of the pump pressure to the one or more selected thresholds, determining whether the value of the pump pressure associated with the pump is less than the one or more selected thresholds, and generating an alarm signal to activate the warning indicator, thereby to provide an alert when the pump pressure drops below the one or more selected thresholds when offloading the contents.

12. The method as defined in claim 9, wherein the memory of the one or more remotely positioned monitoring servers includes a notification module configured to transmit a notification message to one or more remotely positioned predetermined devices responsive to the improper operational condition, the notification message including one or more descriptions of a symptom associated with the improper operational condition of the pump engine and the pump.

13. The method as defined in claim 9, wherein the status monitoring and communication device includes a transceiver in communication with the one or more processors associated with the status monitoring and communication device, the transceiver configured to transmit the generated data signals as one or more communication messages in a short burst data format to a remotely positioned gateway via a satellite network.

14. The method as defined in claim 9, wherein the memory of the one or more remotely positioned monitoring servers further includes a grouping module, and the method further comprising:

segmenting the monitored sensor data into one or more groupings based on the physical properties associated with the pump engine and engine of the marine barge, and transmitting the one or more segmented groupings, thereby to indicate a maintenance condition to maintain a life-cycle management of the pump engine and the engine based on the physical properties associated with the pump engine and the engine of the marine barge.

15. The method as defined in claim 9, wherein the memory of the one or more remotely positioned monitoring servers further includes a fault adviser module, and the method further comprising:

retrieving a pre-selected predefined rule from a rule database, the predefined rule based on historical data associated with the operational conditions of the pump and the pump engine;

comparing a pre-selected data retrieved from the monitored sensor data to the retrieved selected predefined rule to predict a failure associated with the pump and the pump engine; and generating a diagnosis report to initiate an intervention for maintenance associated with the predicted failure associated with the pump and the pump engine, thereby to reduce downtime associated with an unplanned intervention for repair.

16. The method as defined in claim 9, wherein the status monitoring and communication device is connected to and in communication with the input/output module via the relay control module positioned in a housing, the housing positioned adjacent a location of the pump and the pump engine on the marine barge, the input/output module having one or more input channels and one or more output channels, the one or more input channels connected to the one or more sensors, and the one or more output channels connected to the relay control module and the warning indicator.

17. A kit to monitor remotely operational conditions of a pump engine and a pump mounted on a marine barge during offloading operation of barge contents, the kit comprising:

a container;

a housing positioned in the container, configured to be connected to the marine barge, and configured to monitor the pump engine and the pump when connected to the marine barge, the housing having an electronic assembly positioned therein, the electronic assembly having a relay control module and an input/output module;

a status monitoring and communication device positioned in the container and configured to be communicatively connected to the relay control module, the status monitoring and communication device (a) having one or more processors, (b) configured to be connected to a power source of the marine barge, (c) positioned to be connected to receive generated data signals from one or more sensors, and (d) configured to transmit the generated data signals therefrom; and a warning indicator (a) positioned in the container, (b) configured to be connected to the electronic assembly, and (c) responsive to one or more determinations that one or more selected thresholds, associated with the operational conditions of the pump engine and the pump when sensed by the one or more sensors, have been met, thereby to indicate an improper operational condition and to provide a warning when offloading the contents.

18. The kit of claim 17, wherein the status monitoring and communication device is configured to be connected to and in communication with the input/output module via the relay control module positioned in the housing, the housing configured to be positioned adjacent a location of the pump engine and the pump on the marine barge, the input/output module having one or more input channels and one or more output channels, the one or more input channels configured to be connected to the one or more sensors, and the one or more output channels configured to be connected to the relay control module and the warning indicator.

19. A fleet monitoring system to monitor remotely operational conditions of a pump engine and a pump mounted on each of a plurality of marine barges so that the plurality of marine barges defines a fleet operative to offload barge petroleum product contents, the system comprising:

a plurality of housings, each (a) connected to one of the plurality of marine barges in the fleet, (b) positioned to monitor the pump engine and the pump, and (c) having an electronic assembly positioned in the housing, the electronic assembly having a relay control module and an input/output module;

a plurality of sensors each (a) communicatively connected to the relay control module of the housing via the input/output module, (b) positioned to sense physical properties associated with the pump engine and the pump, and (c) generate data signals indicative of the operational conditions of the pump engine and the pump;

one or more status monitoring and communication devices associated with each of the plurality of housings and communicatively connected to the relay control module thereof, each of the one or more status monitoring and communication devices having one or more processors, positioned to receive the generated data signals from the one or more sensors, and transmit the generated data signals therefrom;

one or more warning indicators each connected to the electronic assembly and responsive to one or more determinations that one or more selected thresholds have been met, the one or more selected thresholds associated with operational conditions of the pump engine and the pump and sensed by the one or more sensors, thereby to indicate an improper operational condition when offloading contents; and one or more remotely positioned monitoring servers having a memory, positioned remote from each of the plurality of marine barges in the fleet, and in communication with the one or more status monitoring and communication devices, the one or more remotely positioned monitoring servers configured to:

store the generated data signals from the one or more sensors as monitored sensor data, and display a real-time visual representation of the monitored sensor data on a display associated with the one or more remotely positioned monitoring servers, thereby to report the operational conditions of the pump engine and the pump and thereby to define a dashboard interface to monitor the pump engine and the pump during the offloading operation of contents.

20. The system as defined in claim 19, wherein the one or more determinations, by the input/output module in communication with the one or more warning indicators, that the one or more preselected thresholds have been met, includes:

receiving a pump engine rotational speed signal associated with a rotating component of the pump engine from the one or more sensors, the received pump engine rotational speed signal corresponding to a value of a pump engine rotational speed, comparing the value of the pump engine rotational speed to the one or more selected thresholds, determining whether the value of the pump engine rotational speed exceeds the one or more selected thresholds, and generating an alarm signal to activate the one or more warning indicators, thereby to provide an alert when the pump engine rotational speed exceeds the one or more selected thresholds when offloading contents.

21. The system as defined in claim 19, wherein the one or more determinations, by the input/output module in communication with the one or more warning indicators, that the one or more selected thresholds have been met, includes:

receiving a pump pressure signal associated with the pump from one or more of the plurality of sensors, the received pump pressure signal corresponding to a value of a pump pressure, the pump positioned to transfer contents from each of the plurality of marine barges in the fleet to one or more storages, comparing the value of the pump pressure to the one or more selected thresholds, determining whether the value of the pump pressure associated with the pump is less than the one or more preselected thresholds, and generating an alarm signal to activate the one or more warning indicators, thereby provide an alert when the pump pressure drops below the one or more selected thresholds when offloading contents.

22. The system as defined in claim 19, wherein the memory of the one or more remotely positioned monitoring servers includes a notification module configured to transmit a notification message to one or more remotely positioned predetermined devices responsive to the improper operational condition, the notification message including one or more descriptions of a symptom associated with the improper operational condition of the pump engine and the pump, thereby to provide notification that the one or more warning indicators has been activated and prompt for a condition-based corrective maintenance.

23. The system as defined in claim 19, wherein each of the one or more status monitoring and communication devices includes a transceiver in communication with the one or more processors associated with the one or more status monitoring and communication devices, the transceiver configured to transmit the generated data signals as one or more communication messages in a short burst data format to a remotely positioned gateway via a satellite network.

24. The system as defined in claim 19, wherein the memory of the one or more remotely positioned monitoring servers further includes a grouping module configured to:

segment the monitored sensor data into one or more groupings based on the physical properties associated with the pump engine and engine of each of the plurality of marine barges in the fleet, and transmit the one or more segmented groupings, thereby to indicate maintenance for life-cycle management of the pump engine and the engine based on the physical properties associated with the pump engine and the engine of each of the plurality of marine barges.

25. The system as defined in claim 19, wherein the memory of the one or more remotely positioned monitoring servers further includes a fault adviser module configured to:

retrieve a pre-selected predefined rule from a rule database, the predefined rule based on historical data associated with the operational conditions of the pump engine and the pump, compare a pre-selected data retrieved from the monitored sensor data to the retrieved selected predefined rule to predict a failure associated with the pump engine and the pump, and generate a diagnosis report to initiate an intervention for maintenance associated with the predicted failure associated with the pump engine and the pump, thereby to reduce downtime associated with an unplanned intervention for repair.

26. The system as defined in claim 19, wherein the one or more status monitoring and communication devices is connected to and in communication with the input/output module via the relay control module positioned in each of the plurality of housings, each of the plurality of housings positioned adjacent a location of the pump engine and the pump on each of the plurality of marine barges in the fleet, the input/output module having one or more input channels and one or more output channels, the one or more input channels connected to the one or more sensors, and the one or more output channels connected to the relay control module and the one or more warning indicators.

* * * * *